United States Patent [19]

Jones

[11] 4,355,511
[45] Oct. 26, 1982

[54] WAVE ENERGY CONVERSION

[76] Inventor: Dedger Jones, 885 Freeway Dr. North, Columbus, Ohio 43229

[21] Appl. No.: 917,363

[22] Filed: Jun. 23, 1978

Related U.S. Application Data

[63] Continuation-in-part of Ser. No. 817,973, Jul. 22, 1977, abandoned.

[51] Int. Cl.³ .................... F03B 13/12; F04B 17/00
[52] U.S. Cl. .................................... 60/507; 60/398; 60/504; 417/333; 290/42
[58] Field of Search ............... 60/495, 496, 497, 504, 60/507, 498, 398; 290/45, 53; 417/333

[56] References Cited

U.S. PATENT DOCUMENTS

| | | | |
|---|---|---|---|
| 3,668,412 | 6/1972 | Vrana et al. | 290/53 |
| 3,959,663 | 5/1976 | Rusby | 290/53 |
| 3,983,702 | 10/1976 | Reid | 60/501 |

FOREIGN PATENT DOCUMENTS 2812618  9/1978  Fed. Rep. of Germany ........ 290/53

Primary Examiner—Allen M. Ostrager
Assistant Examiner—Stephen F. Husar
Attorney, Agent, or Firm—Karl W. Flocks

[57] ABSTRACT

A system and method for converting the energy of sea waves to useful power through the use of a buoyant float. This float is preloaded (i.e. submerged a predetermined distance beneath the level of a wave trough) and retained at that submerged elevation until such time as it is located beneath a wave crest. The float is then released from beneath the crest to rise through it and the flotational motion is converted to power. The system also provides for an upwardly directed preloading technique and combined systems wherein work is removed in both vertical movement of the float. Unusual gains in efficiency are achieved by this method and system.

49 Claims, 42 Drawing Figures

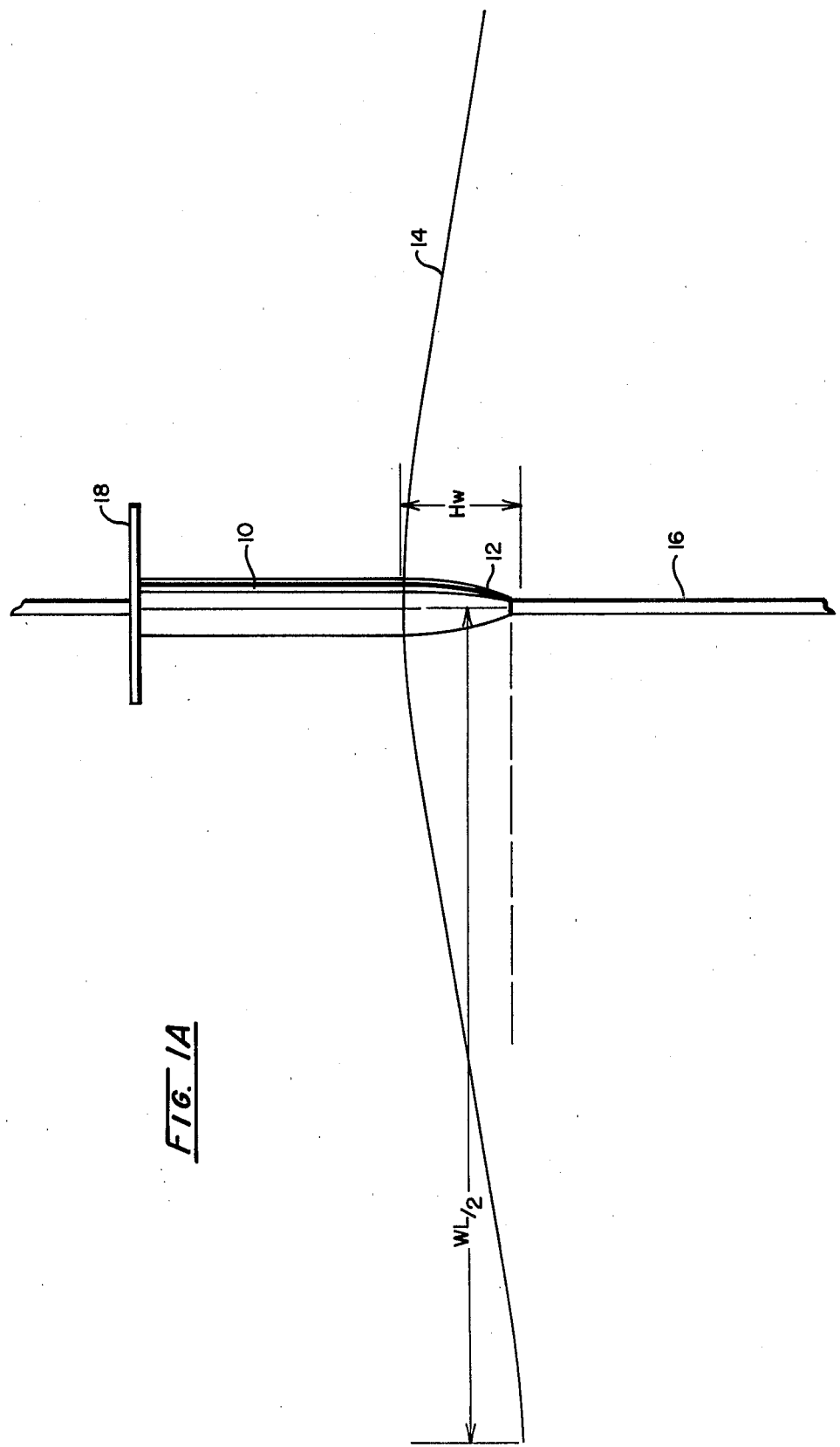

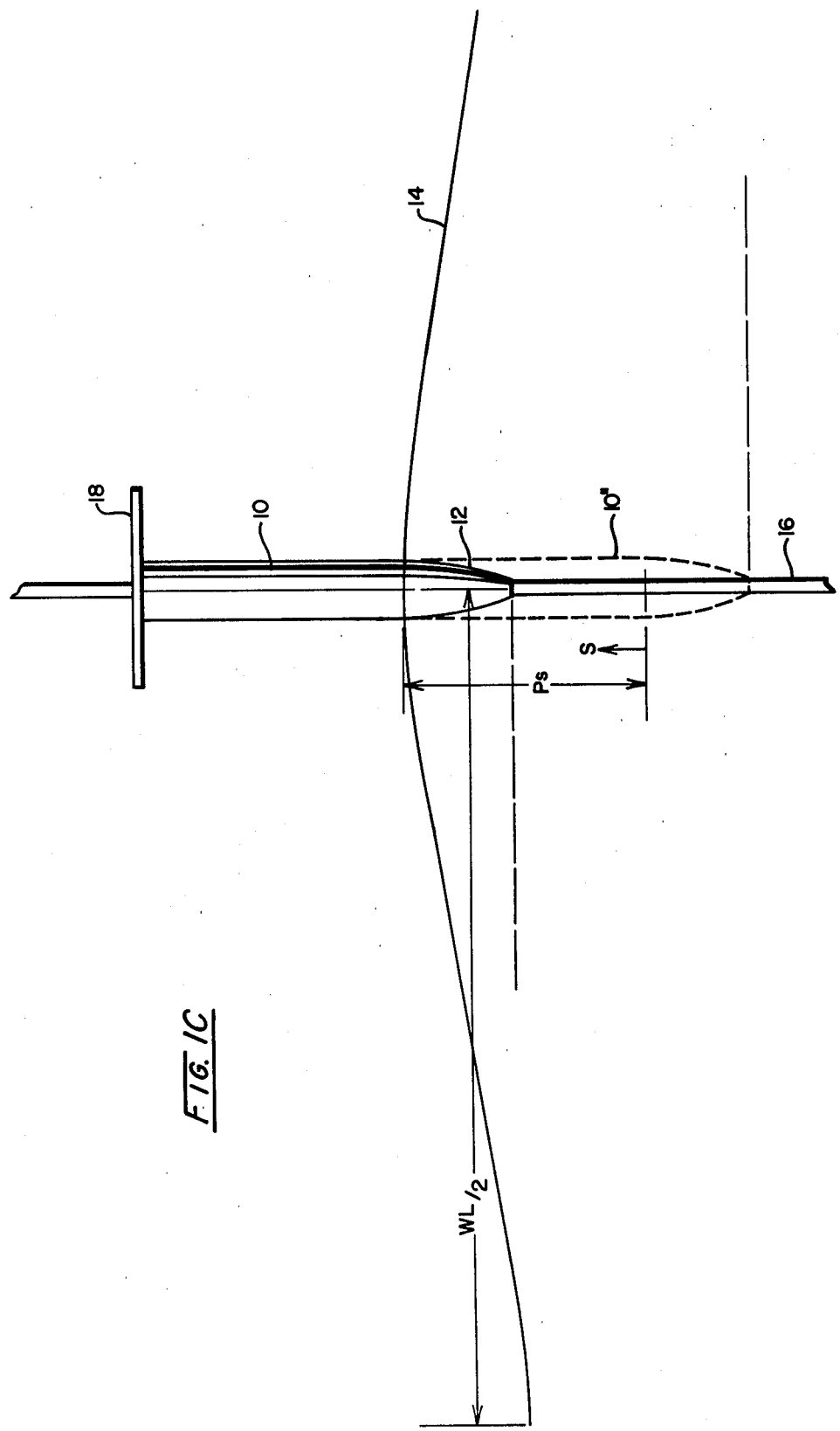

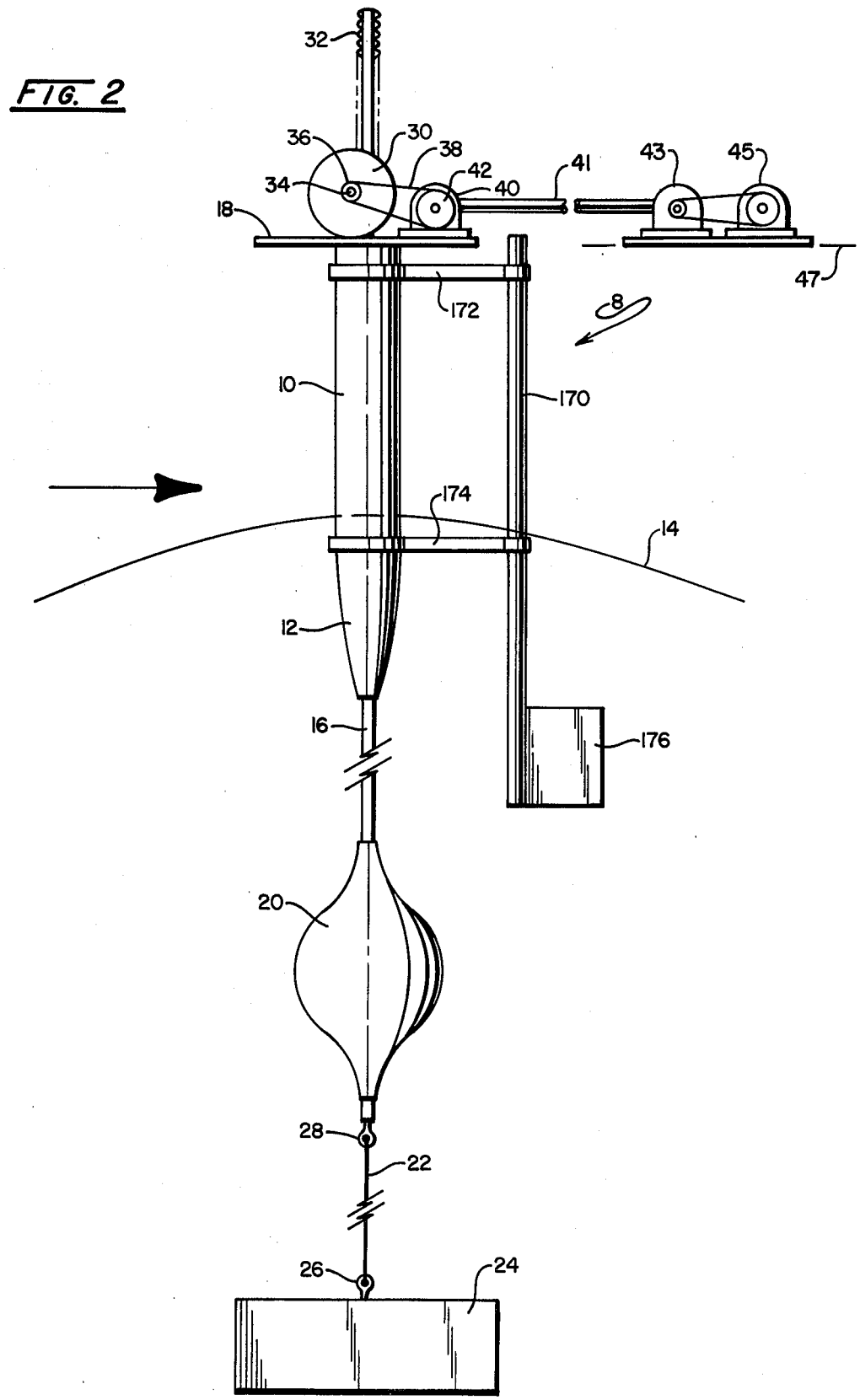

$F_B = \rho A(P_s - S)$

NET WORK OUTPUT SCHEDULE $$W_{net} = \frac{\rho A}{2}\left[H_w^2 + 2nH_w^2\right]$$

(FLOAT IS 6FT. IN LENGTH AND 2FT. IN DIA.)

| n | Wout – 3ft. waves (ft. lbs.) | Wout – 6ft. waves (ft. lbs.) |
|---|---|---|
| 0 | 882.16 | 3,528.64 |
| 1 | 2,646.50 | 10,585.91 |
| 2 | 4,410.80 | 17,643.18 |
| 3 | 6,175.11 | 24,700.46 |
| 4 | 7,939.40 | 31,757.73 |
| 5 | 9,703.75 | 38,815.00 |
| 6 | 11,468.10 | 45,872.30 |
| 7 | 13,232.40 | 52,929.51 |

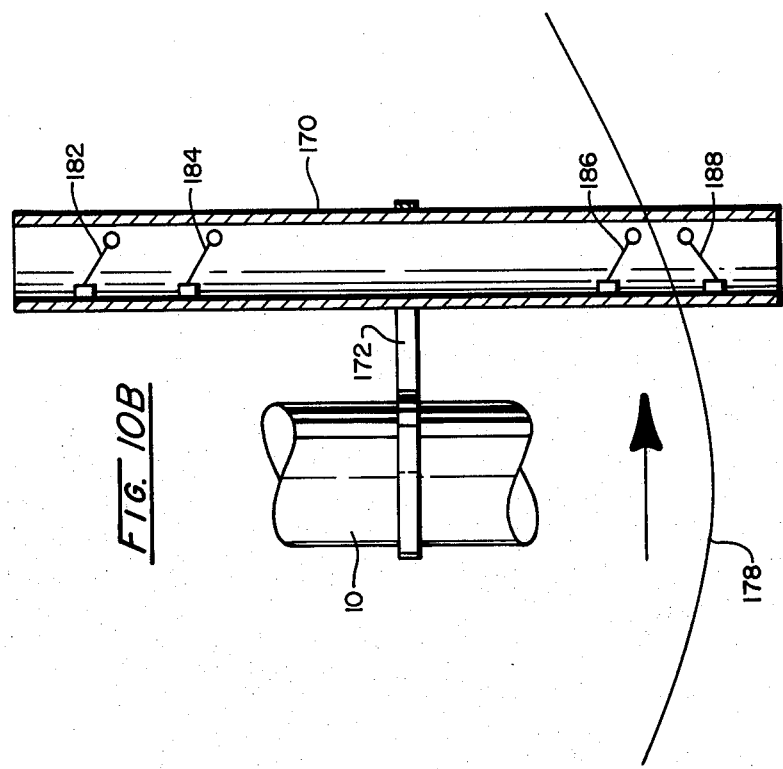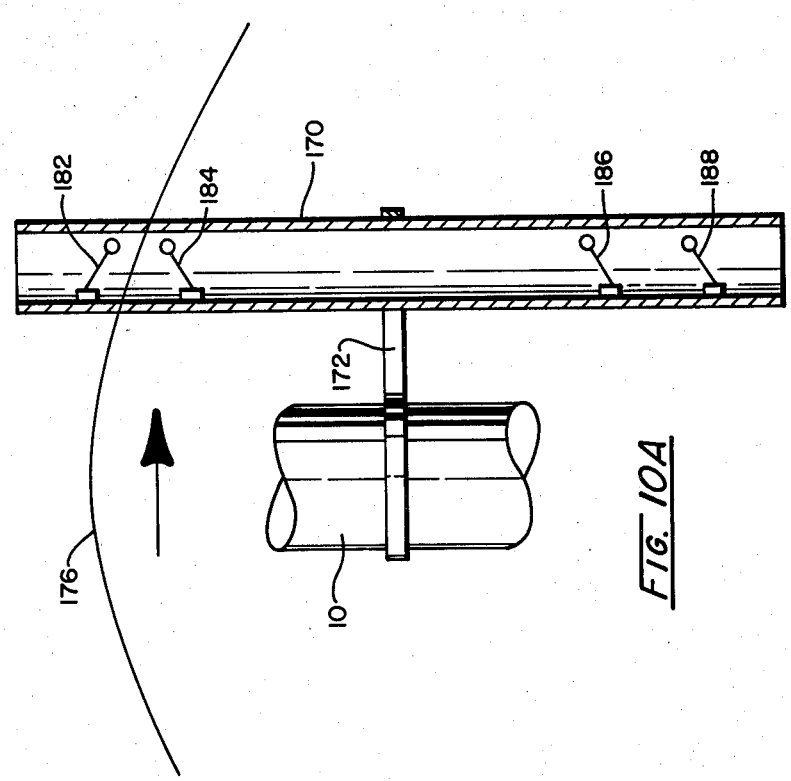

| OPERATION | SW182 | SW184 | SW186 | SW188 | SOL154 | SOL156 |
|---|---|---|---|---|---|---|
| DROP COMMAND | 0 | 0 | 0 | 1 | 0 | 1 |
| DURING DROP | 0 | 0 | 1 | 1 | 0 | 1 |
| SUBMERGED RETENTION | 0 | 1 | 1 | 1 | 0 | 1 |
| RELEASE COMMAND | 1 | 1 | 1 | 1 | 1 | 0 |
| DURING ELEVATION | 0 | 0 | 0 | 0 | 1 | 0 |
| ELEVATED RETENTION | 0 | 0 | 1 | 0 | 1 | 0 |

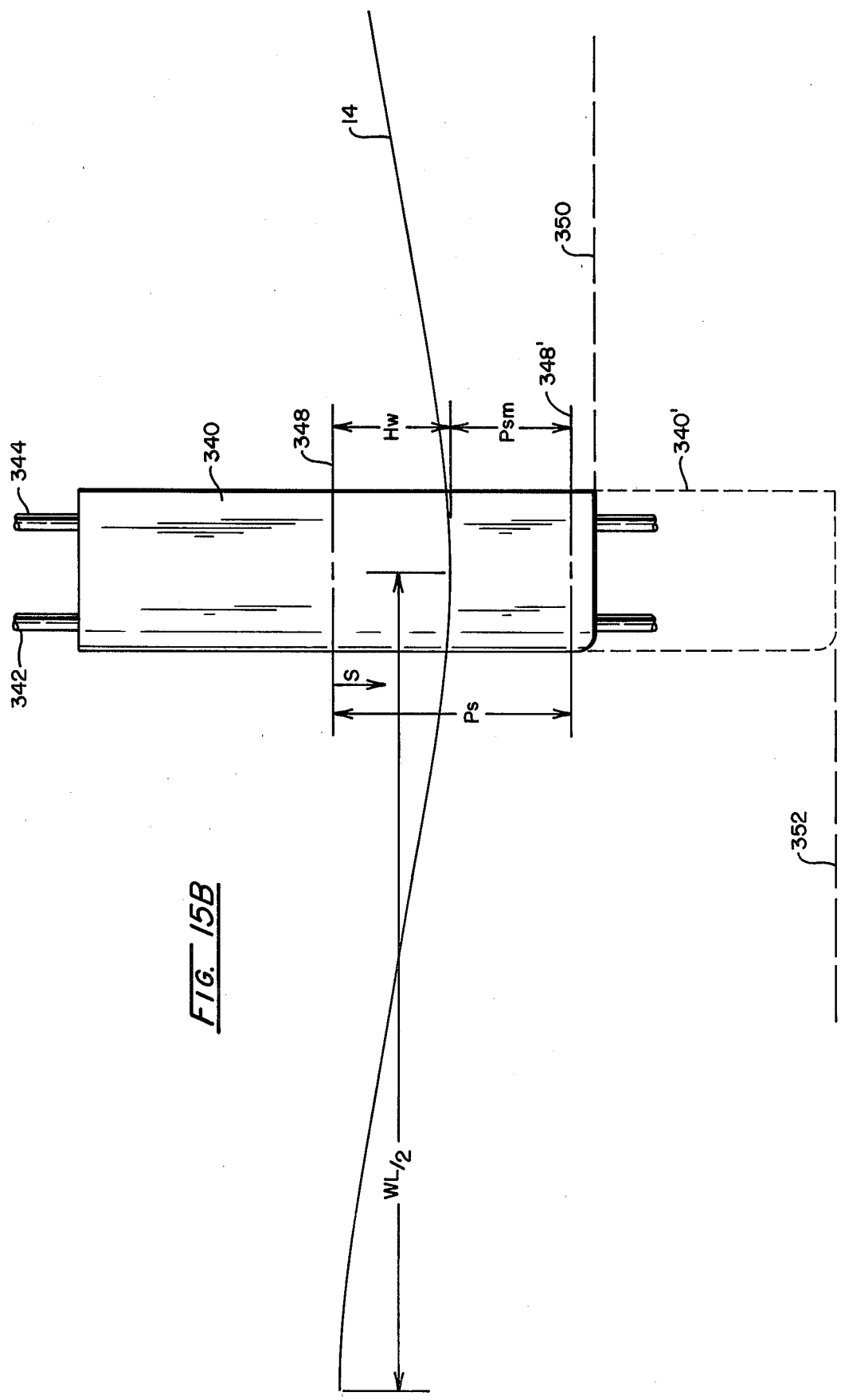

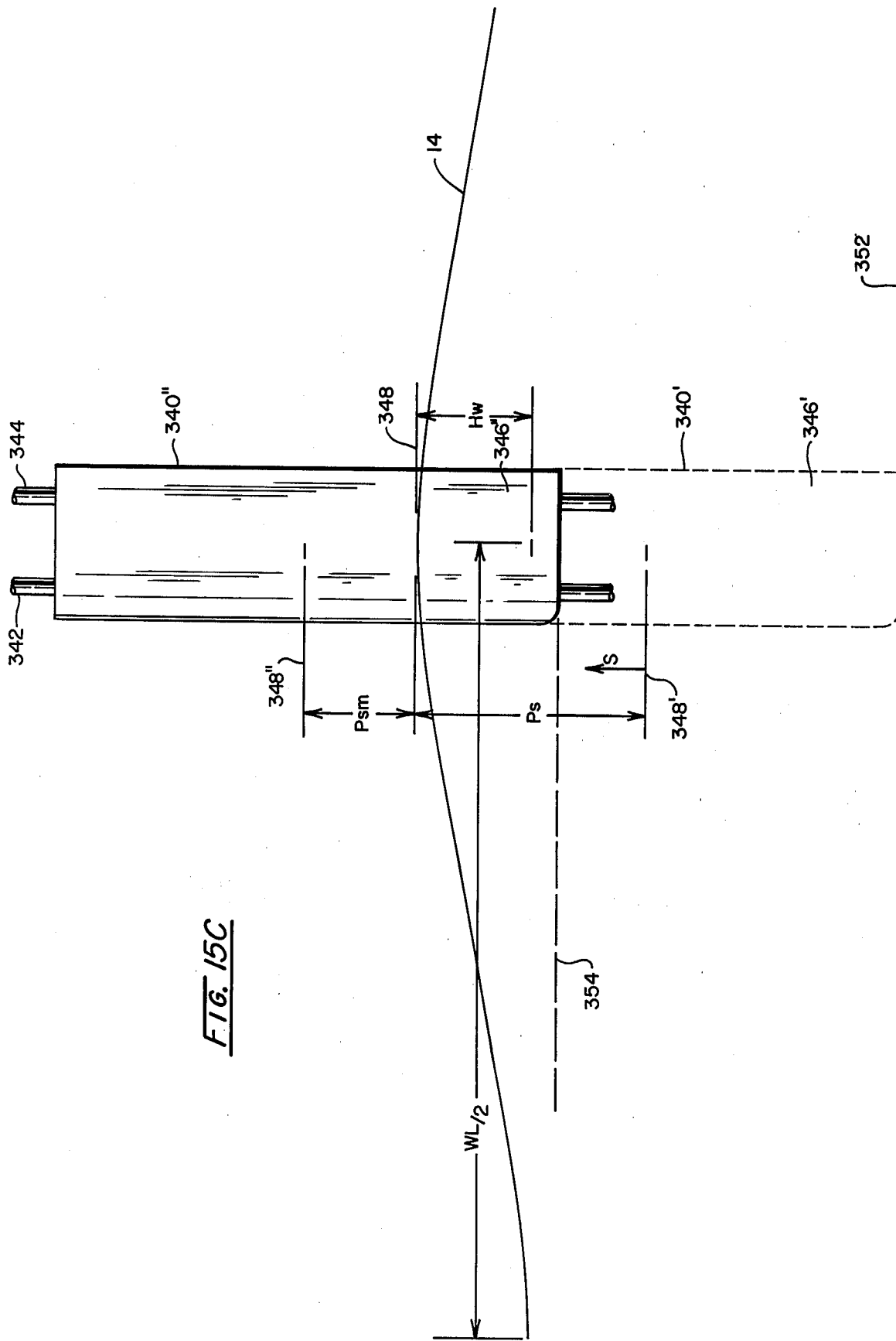

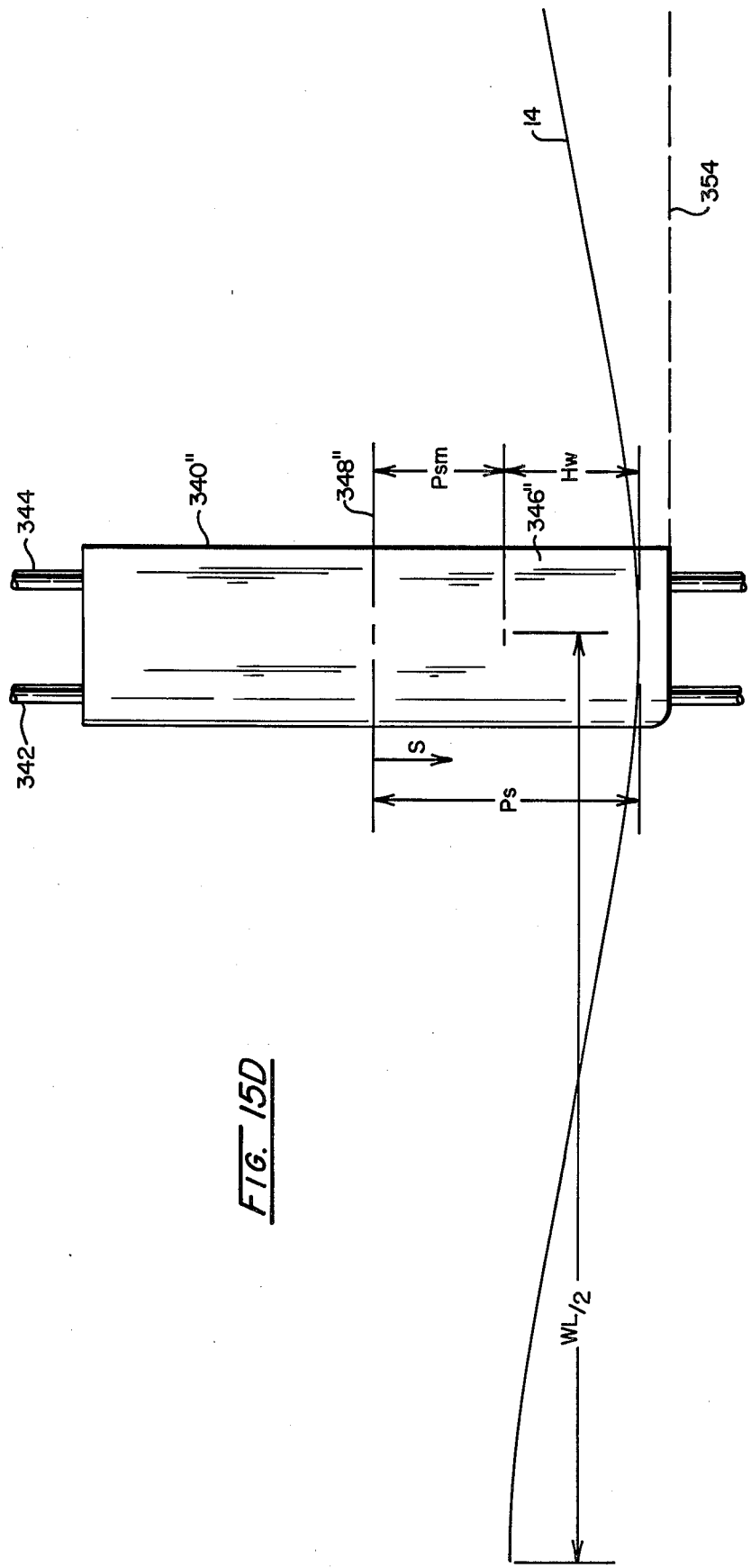

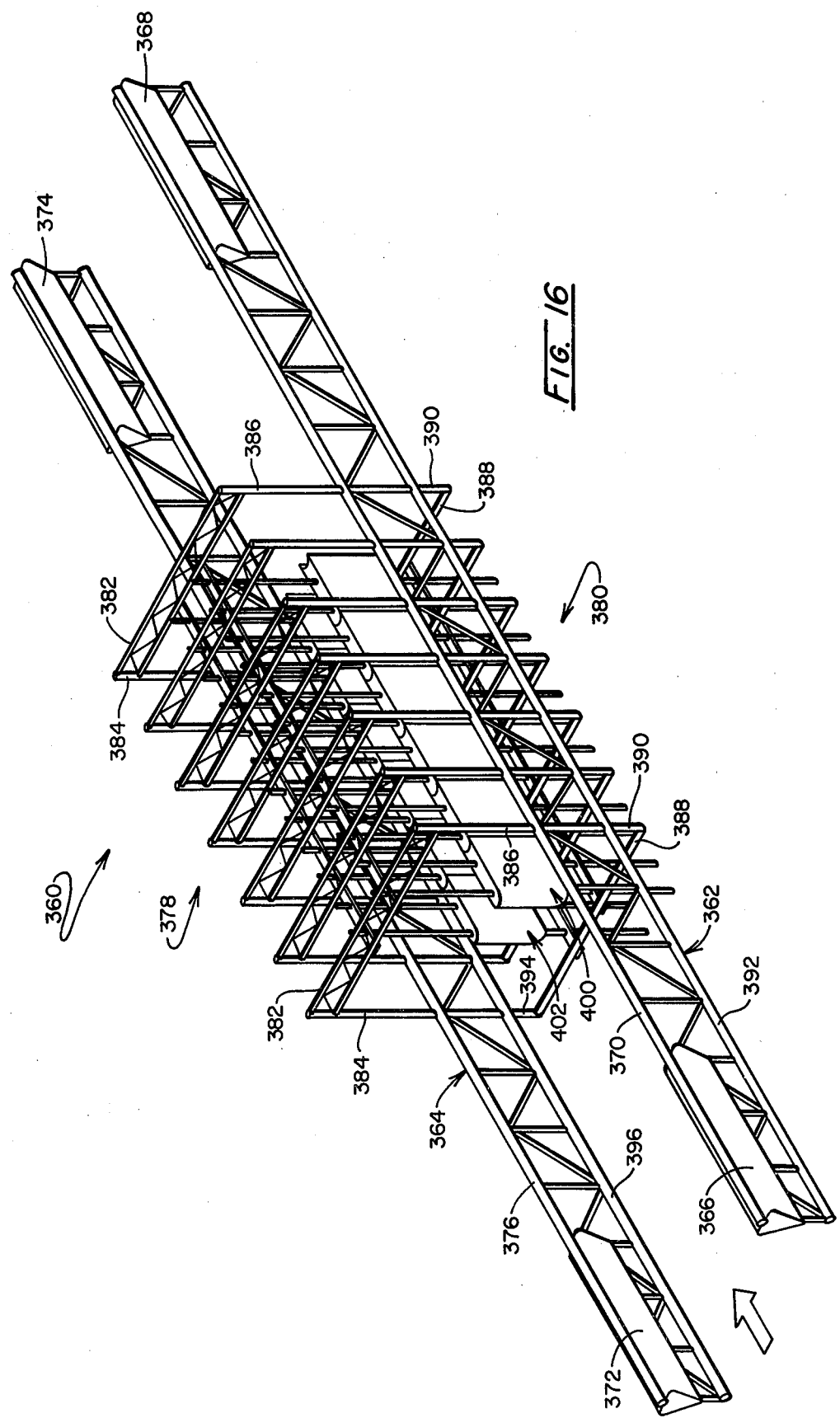

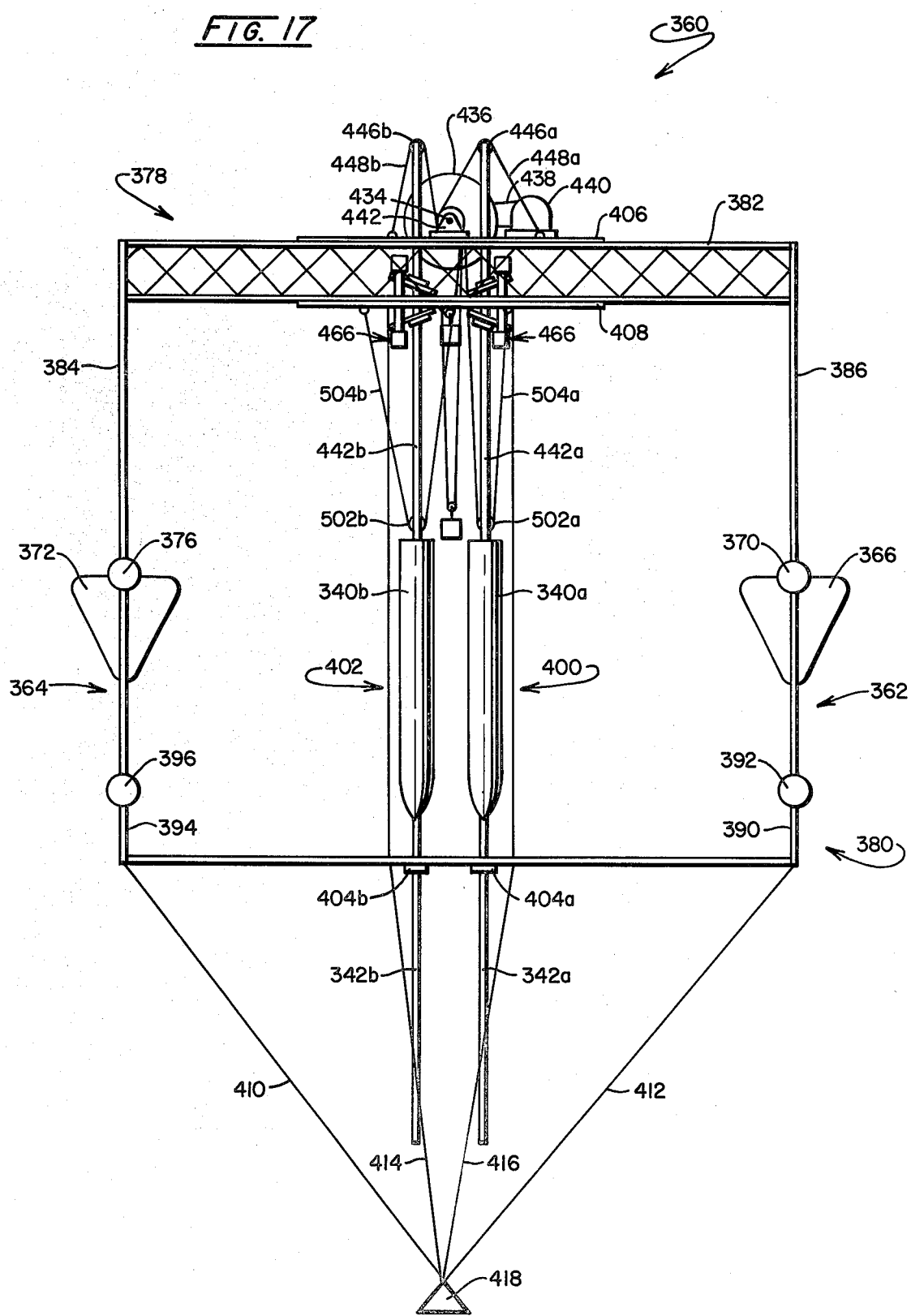

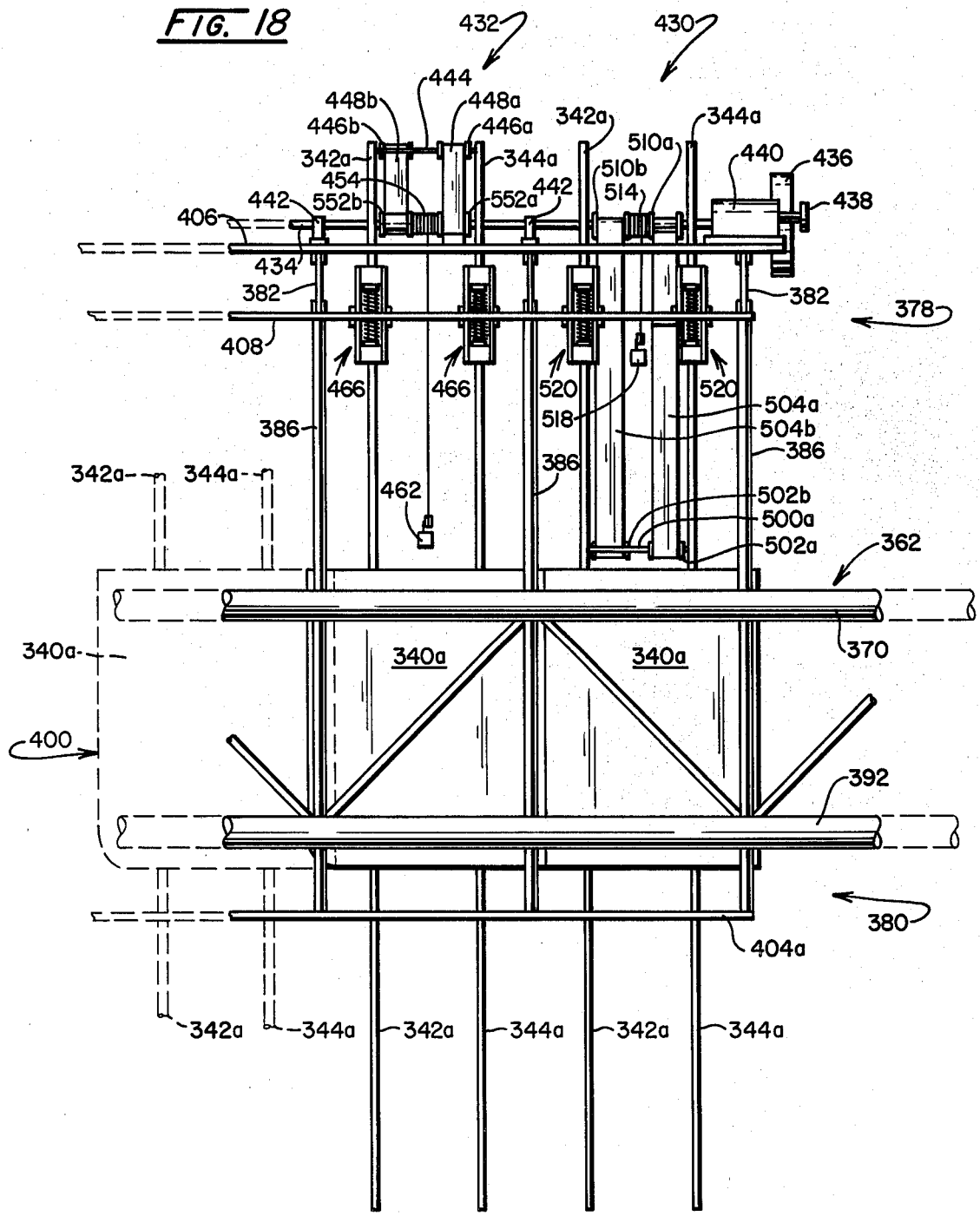

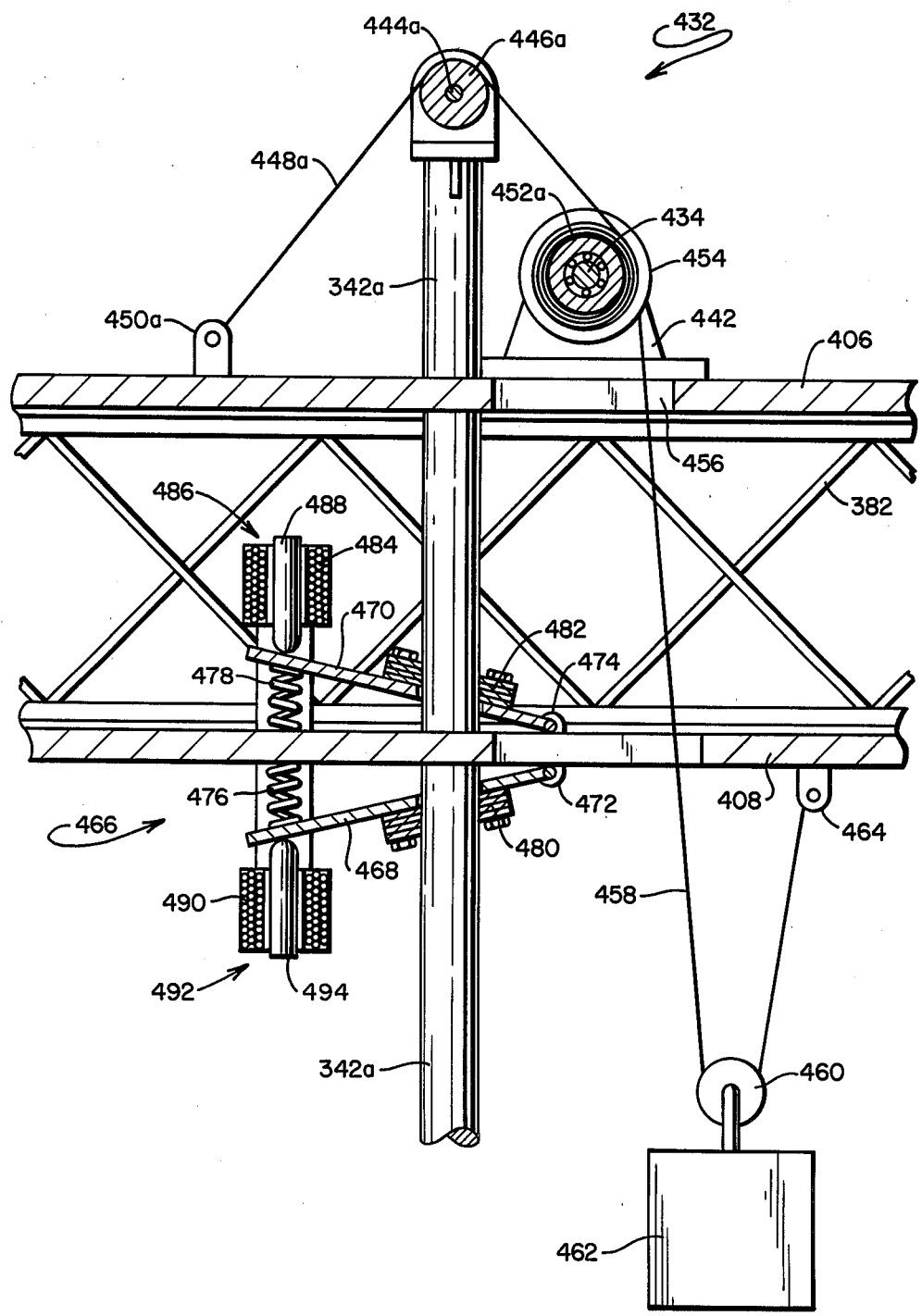

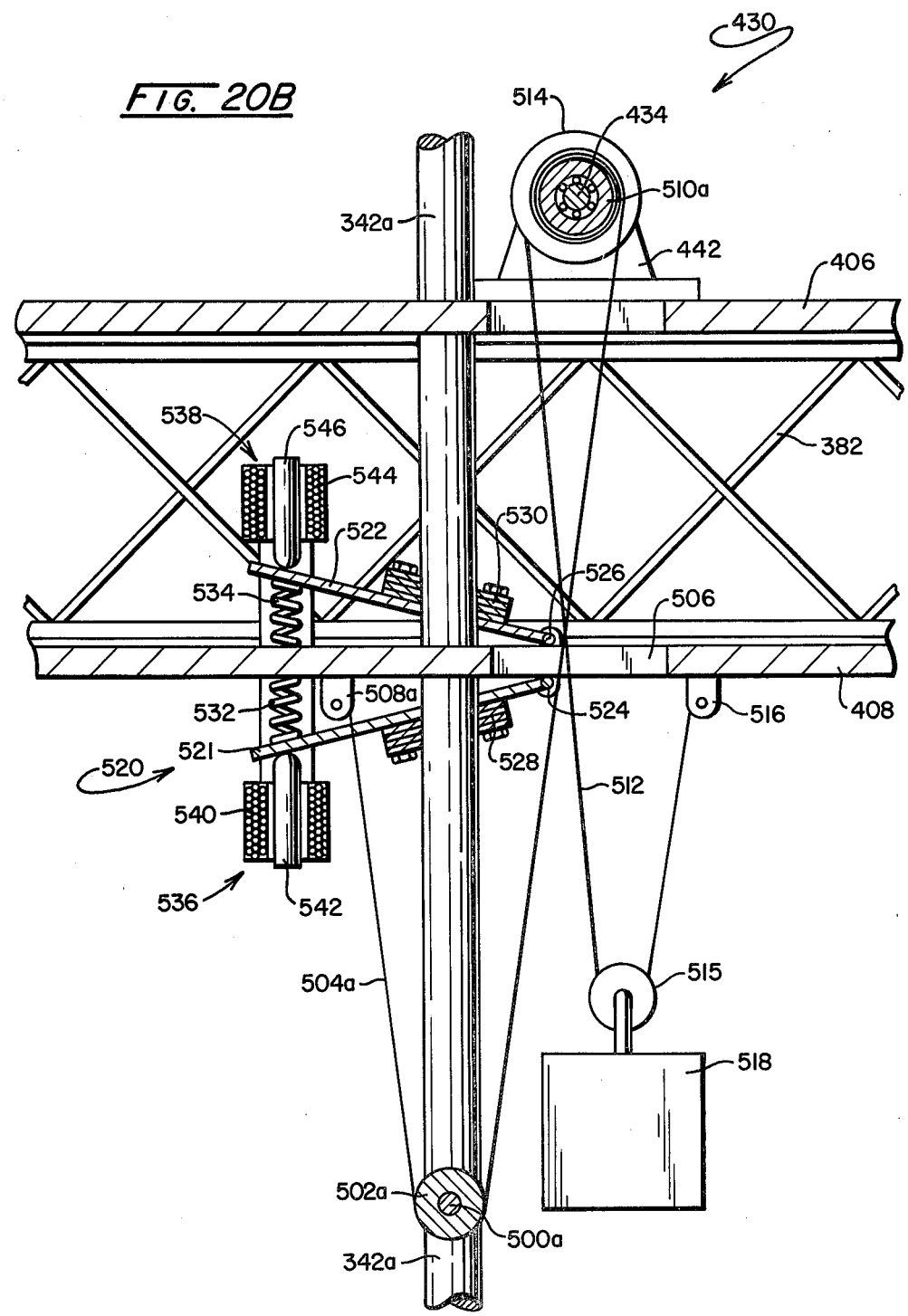

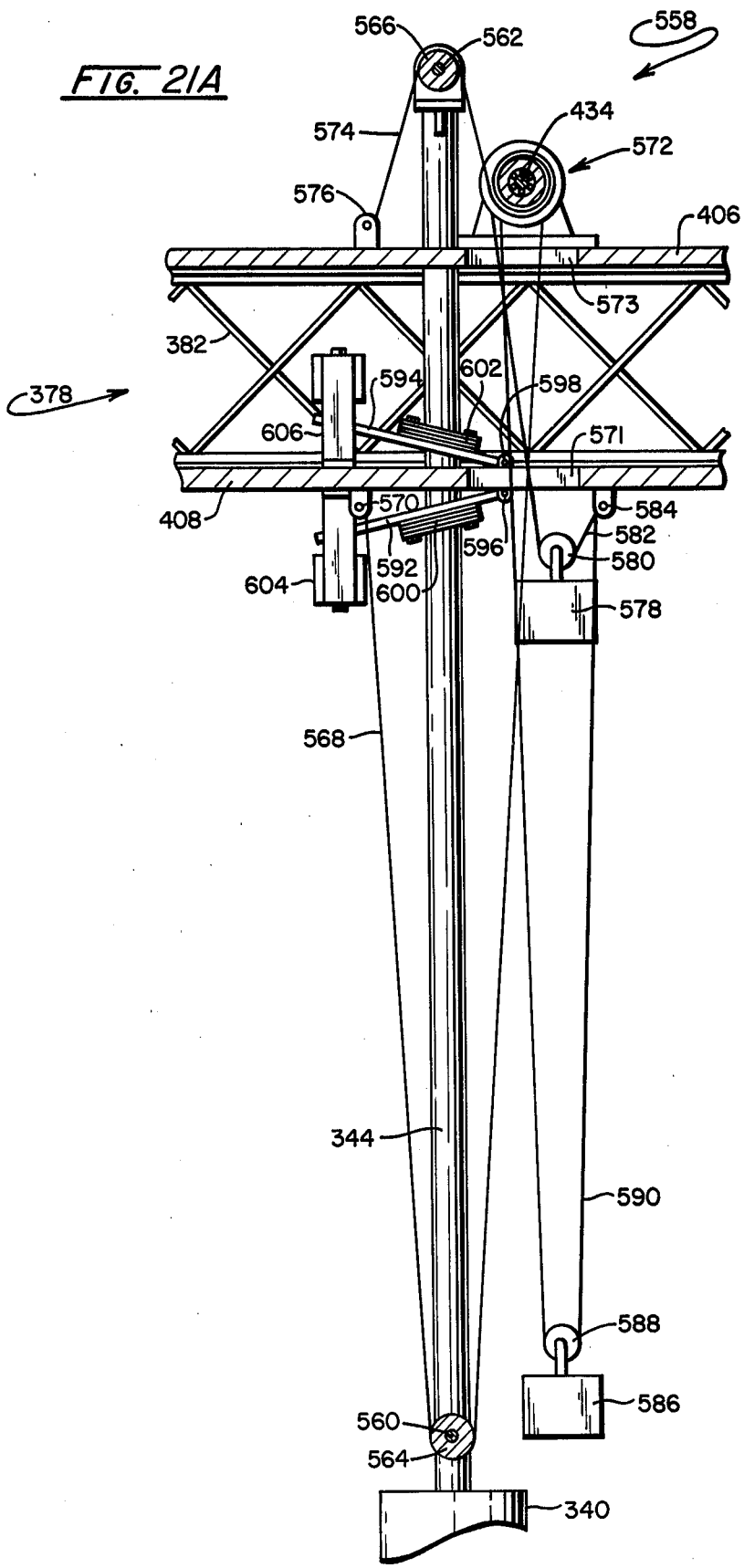

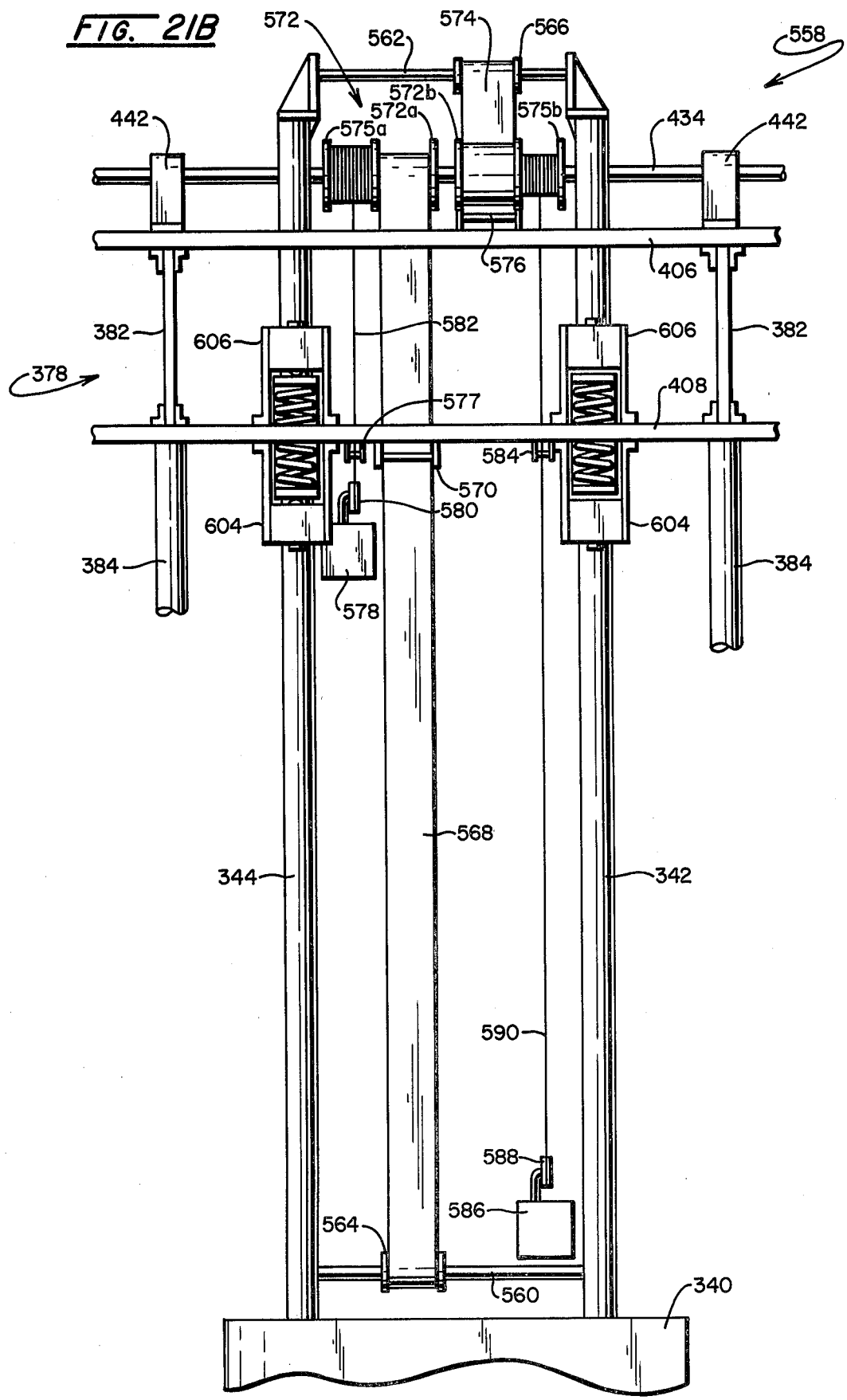

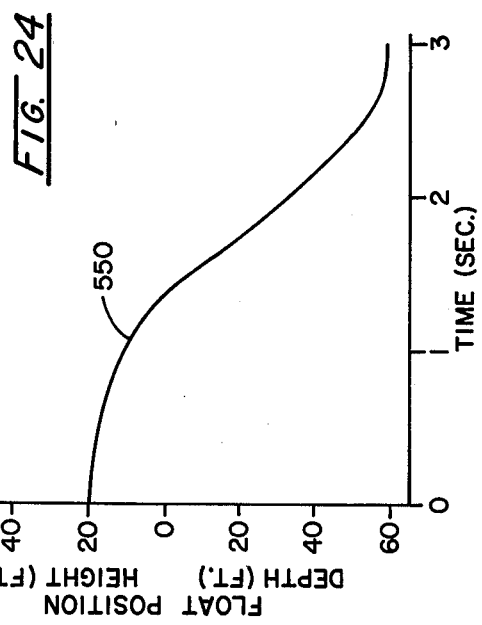
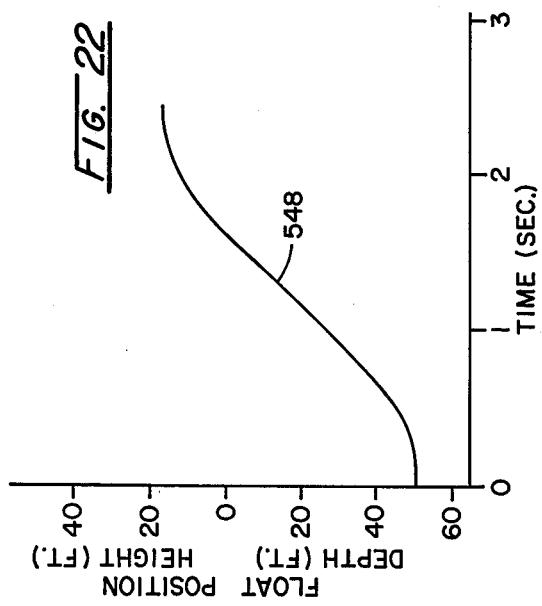
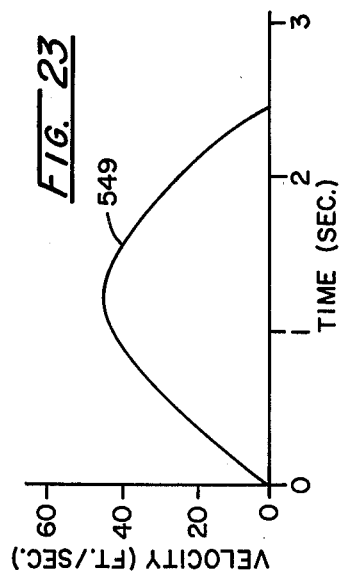

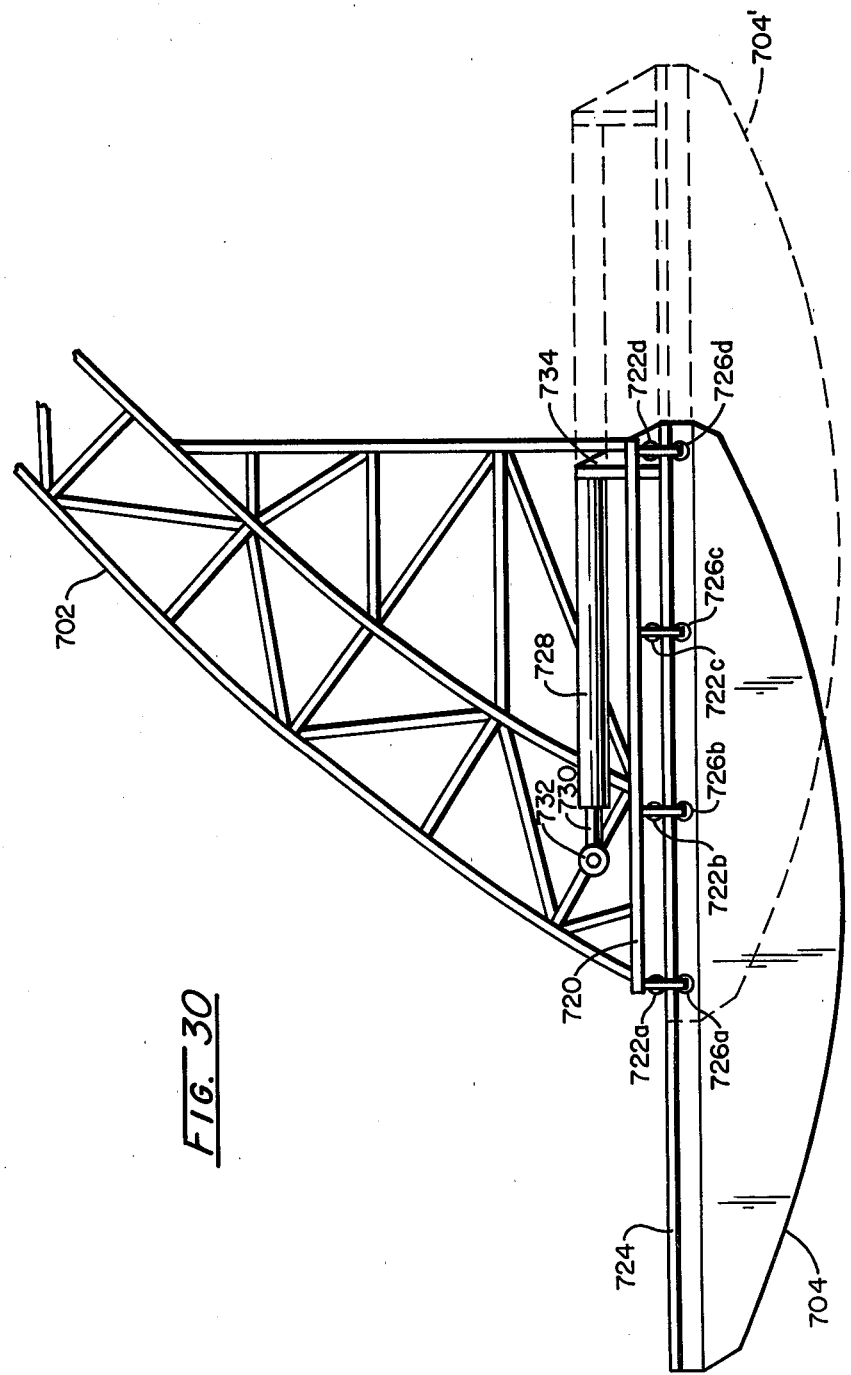

WAVE ENERGY CONVERSION

RELATED APPLICATIONS

The present application is a continuation-in-part of U.S. Application Ser. No. 817,973; filed July 22, 1977; by Dedger Jones entitled "WAVE ENERGY CONVERSION", now abandoned.

BACKGROUND

Studies of wave phenomena in major bodies of water have been recorded, for example by Gerstner as early as 1802. Generally, waves are undulating forms which move along the surface of the sea in consequence of disturbances, the principal natural varieties of which are wind, earth plate movement and the gravitational pull of the moon and the sun. The more frequently encountered waves are generated from the wind and long have been considered a significant source of energy. In effect, this energy is a derivative form of solar energy, the latter occasioning winds interacting with open ocean surfaces over an extent or distance conventionally referred to as the "fetch". This fetch distance as well as wind velocity and the duration of such wind in reacting with open water are considered the principal parameters influencing the development of maximum wind-wave size, such wind-waves being called "sea". By way of further definition, the high point of a wave is referred to as its "crest", its low point is referred to as a "trough", its height is considered as the distance between the trough and crest, and its length is considered the horizontal distance between adjacent crests or similar relative geometric points, and its period is considered to be the time for a wave crest to travel a distance equal to one wave length.

Waves constituting a sea have been described as being irregular or aperiodic in nature. However, for a given location and season their attributes are sufficiently regular for engineering analysis. Wave steepness is gauged as the ratio of height to length, that ratio having a limit of above one to seven. Concerning the latter, it will be apparent that large waves are capable of accepting a greater amount of energy. A relatively modest wind having a velocity of 20 knots is described as raising waves having an average height of about five feet, the energy of which is spread over a band of periods ranging from seven to ten seconds. As impinging wind velocity increases, the amount of energy stored within the wave increases considerably, energy being proportional to the square of wave height, as periods lengthen or frequency diminishes. An eight foot value generally is considered to represent a mean ocean wave height, the latter requiring about a 24 knot wind velocity over a fetch of about 150 miles.

The energy possessed by a given wave is considered to be of a two-fold nature, being partially kinetic energy arising from the motion of orbiting water particles within the wave and the remainder being potential energy represented by the elevation of the gravitational mass center in the wave above sea level. These energy forms are equivalent in waves designated as "swell". Swell formations stem from wind-formed waves no longer under wind influence and, due to decay effects, having wave forms approaching a sine curve. Such waves are capable of extended travel across "deep" water. Concerning the latter term, "shallow-water" waves have been described as those which are traveling in water the depth of which is less than one-half of the wave length. For example, on the continental shelf in 600 feet of water, a wave having a sixteen second period is considered by some authorities to be in shallow water.

Investigators have recognized the extensive amount of power available from ocean wind waves, however, attempts to exploit such power have been somewhat limited in application. For example a myriad of schemes wherein the wave derived oscillatory motion of floats is converted to mechanical work have been proposed. However, such endeavors have been considered impractical for major energy derivation inasmuch as the average (eight foot) wave size encountered in practice represents a low pressure head which is inadequate for carrying out an efficient conversion to electrical power. Further, these devices have not had a capacity permitting both their response to smaller size waves as well as for withstanding the environmental aspects of storm generated waves.

Another approach to tapping the wave energy resource has been through the utilization of a wave powered pump. Such pumps generally comprise a vertical riser or tube which contains a flapper valve and a buoyant float at the surface of the water serving to support the two. As the entire assembly oscillates in conjunction with wave motion, the water which is entrained as a column within the tube is caused to follow the upper motion of the float. As a consequence, as the float descends the inertial forces within the entrained water column are tapped through the use of an accumulator to generate a pressure which may be bled off through a turbo-generator to effect a power conversion. While the technique of conversion is somewhat effective, the system again is limited by the relatively low wave height available for operation.

SUMMARY

The present invention is addressed to a system, method and apparatus for harnessing the energy of wind waves in a manner overcoming the disadvantages otherwise attendant with the limited head available from waves of conventional height. While the invention does utilize the trough to crest effective wave height developed during wave oscillation, it does so in combination with a power float presubmergence technique which significantly expands net available energy. In consequence, practical energy conversion may be realized through operation of the system in conjunction with waves of height typically available in major water bodies.

A feature and object of the invention is to provide a method for converting the energy of waves generated within larger bodies of water into useful power by providing a buoyant body floating within the water and selectively submerging the body to a predetermined level beneath the immediate surface of the water when that body is floating within a trough of a given wave. The submerged body then is retained at that predetermined level for a wave period determined interval, whereupon it is released for vertical flotational movement substantially through the crest of a wave. The resultant extended vertical movement is converted to useful power.

Another object of the invention is to provide the noted step of presubmergence by retaining the buoyant body a predetermined distance above the surface of the wave until it is over a trough portion. At this point, the body is released to permit its gravitational, accelerated descent adequate to achieve the submergence to the predetermined level beneath the surface of the wave trough.

A further feature and object of the invention is to provide a system and method for converting the energy of waves generated within larger bodies of water into useful power utilizing a technique and apparatus wherein an elongate power float is permitted to move flotationally upward through a crest of a wave while, simultaneously, the work of such movement is partially converted to useful and communicable energy. The momentum of this movement is utilized to achieve an enhanced elevation (preloading) of the power float whereupon the apparatus of the invention locks the float at the elevated location. The float then is dropped into a corresponding wave trough to be submerged in a preloaded manner and there retained until situated beneath a next succeeding wave crest. Energy also may be removed during the downward, gravitationally induced movement of the float, inter alia, by virtue of the difference in hydrostatic pressure for given depths with respect to a trough and a corresponding wave crest.

Still another feature and object of the invention is to provide a system and method for preloading the noted power floats through a resort to a floatable support including a structure extending over the waves and supported thereon between buoyant float components. These float components are mutually spaced a distance substantially corresponding with a given wave length. With the arrangement as the spaced float components simultaneously fall into the spaced troughs of a given waveform of one wave length in extent, the structure descends and simultaneously presubmerges the power float beneath a wave crest naturally occuring between the two troughs. The float then is released for flotational upward movement through the crest, whereupon it is recaptured by the support and retained until the spaced support float components are positioned over correspondingly spaced crests. Inasmuch as the power float then is naturally positioned over the corresponding intermediately disposed trough, the float is dropped for the presubmergence purposes. With this embodiment of the invention, work readily is removed from the float in both its gravitationally induced downward movement as well as its flotationally induced upward movement.

As another object of the invention, an energy converter arrangement is provided utilizing flexible elongate bands which are substantially nondeformable in tension and which are alternately unwound from the winding drums of unidirectionally rotatable drive assemblies. With this arrangement, useful work is extractable from the moving power float both during its gravitationally induced downward movement and during its flotationally induced upward movement.

Another feature and object of the invention is to provide an energy conversion system and method of the type described wherein the buoyant body is configured as an elongate tubular wave pump. The wave pump includes a surface float or buoyant body portion coupled to an elongate tube and including a check valve type flow control at the upper level of the tube. This assembly is presubmerged according to the invention and the momentum-activated water is retained under pressure in an accumulator which is tapped to drive a turbo generator.

As another object, the system of the invention provides a platform substantially stable with respect to the instantaneous mean amplitude of the waves operated upon. The buoyant body is supported for vertical movement and in communicating association with the platform to provide its generally vertical movement within the water. The platform further supports an actuator arrangement which may be utilized to effect the submergence of the buoyant body to the noted predetermined level beneath the surface of a trough. This actuator also serves to release the buoyant body at a point within the wave form wherein it flotationally moves vertically to the crest of a wave. A detection control arrangement is provided to predict wave formation and regulate the inventive system.

In one aspect of the invention, the noted stable platform is provided as a pair of relatively large elongate hydraulically shaped hulls or pontoons having adequate mass to maintain the stability of platform upon the water much in the manner of a large ship. As another aspect, the platform is suspended from elongate columns flotationally retained in a vertical orientation and secured by anchors to sea bottom.

Other objects of the invention will, in part, be obvious and will, in part, appear hereinafter.

The invention, accordingly, comprises the system, method and apparatus possessing the construction, combination of elements, arrangement of parts and steps which are exemplified in the following detailed disclosure. For a fuller understanding of the nature and objects of the invention, reference should be had to the following detailed description taken in connection with the accompanying drawings.

BRIEF DESCRIPTION OF THE DRAWINGS

FIGS. 1A, 1B and 1C are schematic portrayals of a float arrangement utilizing the system of the invention, the figures showing various orientations thereof with respect to a sea wave form;

FIG. 2 is a schematic portrayal of one mounting arrangement for the conversion system of the invention;

FIGS. 10A and 10B schematically reveal the switching arrangement for a wave production technique which may be utilized in developing control logic for the method of the invention;

FIGS. 15A-15D are schematic portrayals of a float arrangement utilizing another embodiment of the system of the invention, the figures showing various float orientations thereof with respect to a sea wave form;

FIG. 16 is a perspective view of a structure of another embodiment of the invention with portions removed to reveal internal structure;

FIG. 17 is an end view of the embodiment of the invention shown in FIG. 16;

FIG. 18 is a partial side view of the embodiment of FIG. 16;

FIG. 20A is a partial sectional view schematically revealing a conversion and actuation arrangement of an embodiment of the invention.

FIG. 20B is another partial sectiona view showing an actuation and work conversion embodiment of the invention;

FIG. 21A is a partial sectional view showing an embodiment combining the actuation and conversion arrangements of FIGS. 20A and 20B;

FIG. 21B is a partial side view of the embodiment of FIG. 21;

FIG. 22 is a graph plotting the movement of a hypothetical float from a submerged orientation;

FIG. 23 is a graph plotting the velocity of movement v. time for the float dynamics developing the graph of FIG. 22;

FIG. 24 is a graph plotting the movement of the bottom of the float of FIG. 22 as it is preloaded in a down orientation;

FIG. 25 is a graph plotting velocity v. time for the movement of the hypothetical float utilized in developing the graph of FIG. 24;

FIG. 30 is a partial view of a portion of the structure shown in FIGS. 27 and 28.

DETAILED DESCRIPTION

The opening description of the instant invention necessarily is concerned with the theory of operation thereof, substantiating the unexpected efficiencies generated with the presubmergence or preloading aspects of the system ad method. As the discussion unfolds thereafter, embodiments for the invention are discussed.

In its most basic concept, the theory of the invention shows that the reciprocatory motion of a water supported float in a major water body native environment can be converted to useful work on a highly efficient basis where the float is caused to submerge by an action which, as above, may be designated "preloading" or "presubmergence" at that point in time when the float is situated over a wave trough. The float is locked in such submerged position until it is vertically situated in alignment with a corresponding wave crest, whereupon it is released for upwardly directed movement under buoyancy-derived forces. This upward force and motion is converted to useful energy. The theory is somewhat generalized in nature. However it will be seen to readily demonstrate the efficiencies achieved.

Figure 1B:
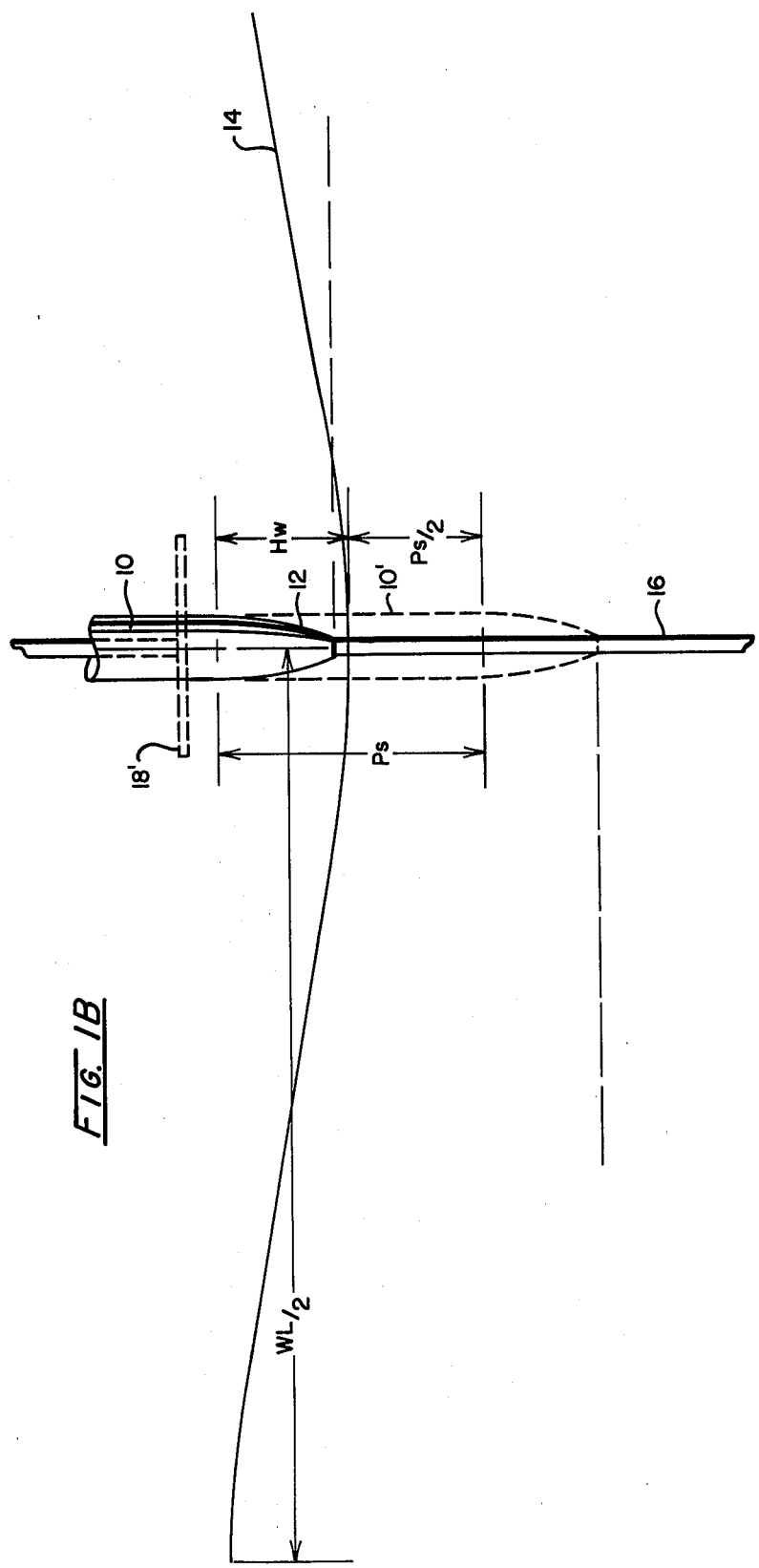

Looking to FIG. 1A, an assembly is shown including an elongate float 10, formed so as to have a streamlined or ellipsoidal static buoyancy portion 12. Portion 12 is shown buoyantly supporting float 10 at the crest of a wave 14 having a waveform evidencing a conventionally encountered steepness ratio of about one-to-seven. The steepness ratio may be less as one-to-eight, but not greater. Wave 14 is depicted having height "Hw" and a length "WL". Float 10 is configured having a circular cross section, the upwardly supported portion thereof having a cylindrical shape. The float is supported for sliding vertical movement upon a vertical post or column 16, extending from beneath the water level to a supporting arrangement (not shown in FIGS. 1A, 1B and 1C). The vertical post 16 extends above mean water level. A platform 18 shown fixed to an upward portion or top of the float 10.

In initially approaching the demonstration of efficiency of the system, for purposes of generating comparative numerical data, it is assumed that the wave height encountered is three feet, a figure representing nearly one-half of the above-discussed mean ocean wave height or mean sea average, and, that the lower disposed buoyancy portion 12 of float 10 is not hydraulically streamlined to a point but is provided to have a flat bottom portion. Additionally, it is assumed that the float 10 is to be preloaded to an extent of twice the wave height so that its potential submergence, represented in FIG. 1B as the distance $P_s$, becomes six feet. Further, for analytical purposes, it is assumed that the float will have a diameter of two feet.

In determining the reaction of float 10 during submergence, as well as its buoyancy-derived rise beneath a wave crest, observations of drag over its surface, as well as the inertial forces in its motion will be made hereinafter; and will be observed to be dismissable.

A theoretical analysis of the inventive system may be provided by a detailed observation of the float 10 and the operational components attendant therewith. In FIG. 1A, float 10 is shown at its maximum rise orientation at the crest of a wave 14 being supported by static buoyant portion 12. Post or column 16 is supported in a generally vertical orientation in consequence of its mounting (FIG. 2) with a submerged stabilizing float 20, mounted in coaxial and symmetric fashion. Float 20 is connected by a submerged cable 22 to an anchor 24 utilizing appropriate eye connectors as at 26 and 28. The anchor 24 may rest upon the bottom of the body of water in which wave energy conversion engine or apparatus is located. With this arrangement, the post 16 is maintained in a substantially vertical orientation, it being recalled that relative water particulate motion within a wave is orbital in nature, not particularly asserting horizontal vectors of force to displace post 16. Further, it may be noted that float 20 is positioned below wave activity.

Platform 18, affixed to the uppermost portion of float 10, is shown supporting a flywheel 30 which is driven in rack and pinion fashion from a rack 32 formed within the uppermost section of post 16. Unitary directional drive to flywheel 30 is provided by a clutch mechanism disclosed in more detail hereinafter and associated with flywheel 30 through a centrally disposed axis 34. Needless to say, the rack 32 is unitary with the post 16 and the pinion coacting and meshing with the rack 32 is supported by the float 10 in such fashion that as the float 10 moves up and down, the pinion coacting with the rack 32 is rotated. Unitary directional drive to the flywheel 30 is provided by a clutch mechanism disclosed in more detail hereinafter. The flywheel 30 is driven through a centrally disposed axis 34. Apparatus can be devised so that the movement of the float 10 activates the pinion and its associated flywheel on the downward movement of the float 10 as well as on the upward movement. However, for the instant embodiment, directional drive to the flywheel only on the upward movement of the float 10 is all that is to be considered. A pulley 36 is mounted coaxially with flywheel 30 and is fixed to axis 34 so as to impart drive through a belt 38 to an energy transfer mechanism, present in the embodiment shown as a turbine pump 40. Pump 40 supplies fluid through the conduit 41 to a hydraulic motor 43 which in turn drives a electrical generator 45. As indicated in the drawings the hydraulic motor 43 and the electrical generator 45 are mounted on a land region such as 47 adjacent to the body of water. Pump 40 is driven from a pulley 42 operatively associated with belt 38 and is mounted upon platform 18. With the arrangement shown, as float 10 ascends following its release from its presubmerged orientation, as shown in phantom in FIG. 1C, it rides coaxially upward upon post 16 to cause the rack and pinion assembly, including rack 32, to rotatively drive flywheel 30 to generate power. It should be understood, however, that other forms of power conversion are available under the teachings of the instant invention.

Figures 3, 4:
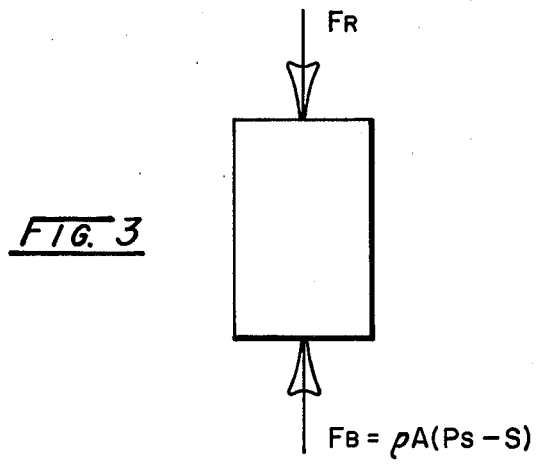
FIG. 3 is a diagram utilized in connection with an analysis of the system of the invention.
FIG. 4 is a network output schedule showing work output values for a series of preloading or presubmerging conditions.

Looking additionally to FIGS. 3 and 4 the unusually advantageous work output efficiencies of the system may be observed. The idealized diagram of FIG. 3 shows that the buoyancy force, $F_B$, for any time, t, may be represented by the following expression:

$$F_B = \rho A(P_s - S), \quad (8)$$

where $\rho$ is the density of water, S is the position of float 10 at any time, t, as diagrammatically revealed in FIG. 1C. FIG. 3 reveals this force, $F_B$, to be opposed by the force, $F_R$, imposed through rack 32, it being understood as later demonstrated that inertial and drag forces are of dismissable value. Considering the general relationship that work, W, is equal to the product of force and distance, the work W, generated at rack 32 may be expressed as follows:

$$W = \int_O^{P_s} F_R dS, \quad (9)$$

which may be expanded to:

$$W = \int_O^{P_s} \rho A(P_s - S) dS, \quad (10)$$

$(P_s - S)$ is the instantaneous depth of float 10 in the water excluding the static buoyancy portion 12. Expression (10) may be expanded as follows:

$$W = \left[ \rho A P_s S - \frac{\rho A S^2}{2} \right]_0^{P_s}, \quad (11)$$

which again may be expanded to the following expression:

$$W = \rho A/2 (Hw + nHw)^2, \quad (12)$$

where n is a preloading multiplier of wave height representing the extent of preloading or presubmergence.

Now, looking to presubmergence, the work required to achieve that operation is analyzed. Generally, this work value, designated $W_{in}$, may be expressed as follows:

$$W_{in} = (F_{Pl})(nAw) \quad (13)$$

which may be expanded to the following expression:

$$W_{in} = \rho A/2 (nHw)^2 \quad (14)$$

The final work product $W_{net}$, for the system then represents the work achieved by buoyant rising of float 10 less the invested preloading work, $W_{in}$, which is expressed as:

$$W_{net} = \rho A/2 [(Hw)^2 + 2n(Hw)^2] \quad (15)$$

Figure 5:
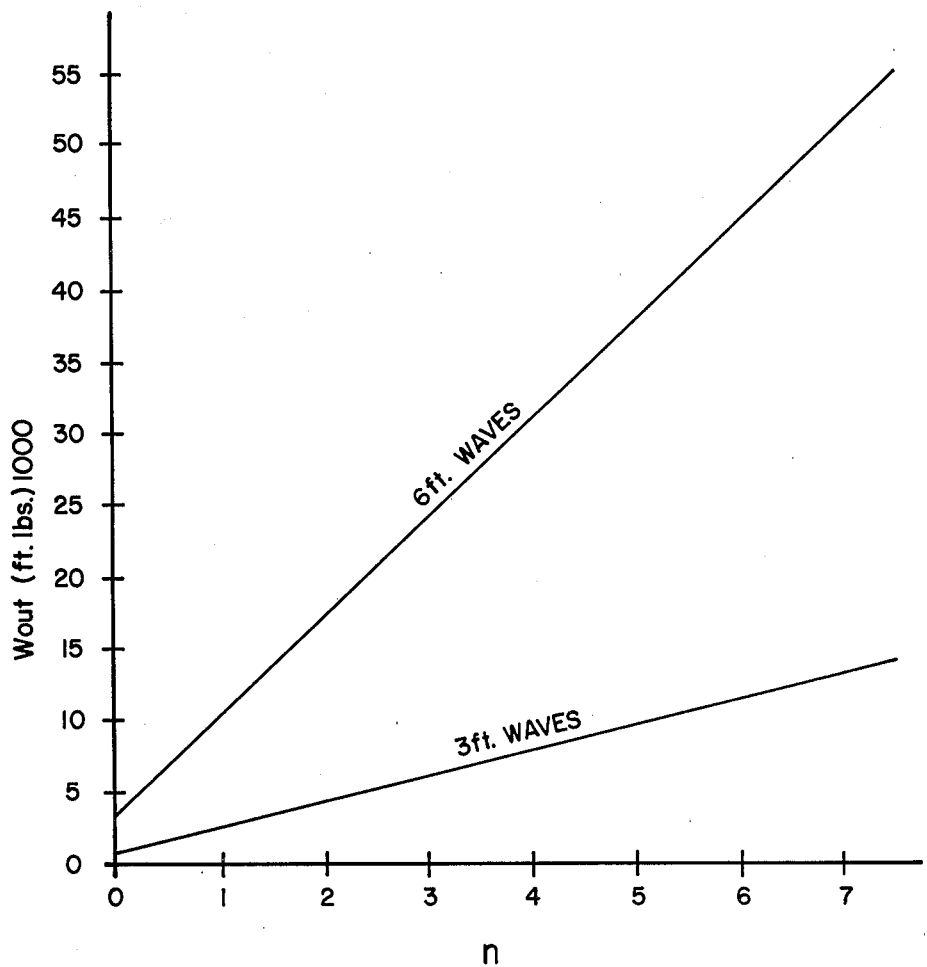
FIG. 5 is a graph plotting the output schedule shown in FIG. 4.

Applying various values for n for the parameters disclosed, and considering wave heights of 3 and 6 feet, the tabulations shown in FIG. 4 reveal significant gains in efficiency as the value of n (depth of presubmergence) is increased from 0, the latter representing prior art efforts and achieving power generation without presubmergence techniques. The values of FIG. 4 are plotted in FIG. 5 as curves to show the expanding efficiencies available with the system of the invention. Of course, as the value of n increases significantly, the analysis shown herein becomes more idealized, inasmuch as frictional and inertial considerations become more prevalent. It additionally should be understood that the value of n may be other than an integer. Of course, the data given in connection with FIGS. 4 and 5 represent computations involving a float of only a two foot diametric extent. More economically significant data is developed where the float size is increased. For example, where a 10 foot diameter float having a length of 20 feet is utilized in 10 foot waves, it will develop 251,200 ft. lbs. net work output without preloading or presubmergence and 753,600 ft. lbs. net work output at n=1.

Looking now to the above noted consideration of drag, assuming that the static buoyancy portion 12 is cylindrical in shape and has a diameter of two feet and a length of eight feet, the flat plate corresponding area A of the float becomes 50.265 ft.$^2$ (i.e. $2 \times 8 \times \pi$). The additional assumptions are made that the density, $\rho$, of water is 62.4 lbs. mass/ft.$^3$, that the viscosity thereof $\mu$, is $2.74 \times 10^{-5}$, and further, that the float 10 will travel the full distance, $P_s$, within one second. This one second value has been empirically observed and requires an average velocity for the float which may be equated with free velocity $u_\alpha^2$ of six ft./sec.

The formula for Reynold's number, $Re_L$, is conventionally given by the following expression:

$$Re_L = \rho u_\alpha L / \mu g_c \tag{1}$$

where, $g_c$, is a conversion constant.

Substituting the above values in expression (1) reveals a Reynold's number of $33.95 \times 10^5$. Inasmuch as this value of Reynold's number is greater than the value thereof, $5 \times 10^5$, considered to designated a transition to turbulent flow, a turbulent flow must be assumed and examined. As described in detail in "Introduction to Fluid Mechanics" by John and Haberman, Prentice-Hall, Englewood Cliffs, N.J. (1971) pp. 176 et seq., the expression for drag, D, with respect to Reynold's numbers between $5 \times 10^5$ and $5 \times 10^7$ is given as follows:

$$D = \frac{1/2(\rho/g_c)u_\alpha^2 A(0.074)}{Re_L^{1/5}} \tag{2}$$

Substituting the above values in expression (2) reveals a drag, D, of 6.41 lbs. Turning again to FIGS. 1A–1C an observation of the movement of float 10 with respect to the elevation of wave 14 is appropriate. In FIG. 1C, float 10 is shown in solid line fashion as it is supported by static buoyancy portion 12 at the peak of the wave crest. FIG. 1B shows the same location of float 10 in solid line fashion as well as its position in phantom at 10' just following presubmergence to an equivalent one wave height, or a distance, $P_s/2$. Float 10 is held in the position shown at 10' in FIG. 1B until such time as it is substantially symmetrically centered beneath a crest at wave 14, as represented at 10" in phantom at FIG. 1C. From this position the float is released to reassume the position shown in solid line fashion both in FIG. 1C and FIG. 1A.

The value for drag, D, based upon turbulent flow having the value of 6.41 lbs. derived above is considered to be high, inasmuch as that value is developed under the assumption that flow is turbulent over the total surface area of float 10. However, an assumption of turbulent flow about the total float surface during its upward movement from the fully submerged orientation represented at 10" in FIG. 1C is not realistic. As described in the John and Haberman text cited above, an expression representing a more accurate approximation of actual drag is given by the following expression:

$$C_D = C_{Dt} - 1700/Re_L \tag{3}$$

where $C_D$ is the dimensionless skin friction drag coefficient for actual drag, and $C_{Dt}$ is the corresponding coefficient for turbulent drag and is represented by the following expression:

$$C_{Dt} = \frac{0.074}{Re_L^{1/5}} \tag{4}$$

Drag, D, now may be computed with the above revised considerations in accordance with the following expression:

$$D = \tfrac{1}{2}\rho/g_c \mu_\alpha^2 A C_D \tag{5}$$

Substituting the newly developed values in expression (5), above, reveals a more realistic drag, D, equal to 5.34 lbs., representing the drag value at the commencement of buoyant rise of float 10 from the position 10" of FIG. 1C. Inasmuch as this value represents a maximum at the point of full submergence, it will diminish toward a zero value as float 10 reaches the orientation shown in FIG. 1A, or in solid line fashion in FIG. 1C. Looking to a comparison of value of drag against the value of buoyant force at the time of submergence beneath a crest, such maximum buoyant force, $F_B$, conventionally is computed in accordance with the following expression:

$$F_B = \rho P_s A \tag{6}$$

Inserting the value above, $F_B$—1,568.3 lbs. Comparing the latter value with the 5.34 lb. drag computation above, it may be observed that this viscous drag may be considered to be negligible for the purposes of the analysis of overall efficiency.

As noted above, it is also appropriate to investigate the inertial forces extant at such time as float 10 is released from the crest-submerged orientation shown in phantom in FIG. 1C and commences to rise. At the instant of release of the float 10, a hesitation in movement will be witnessed as the float seeks to achieve what may be considered the terminal velocity assumed above as 6 ft./sec. This time of hesitation can be computed through conventional dynamic analysis, the force at the commencement of release being equivalent to the product of the mass of the float and its acceleration, i.e., F=ma. Inasmuch as drag considerations may be ignored under the above analysis, the force considered in the classic equation may be that developed as the buoyancy force, $F_B$, of expression (6) above. The mass of the float also may be estimated. Under practical operational conditions, the float 10 is constructed of buoyant, structurally sufficient, but very light plastic. However, considering a somewhat "worst case" analysis, float 10 is assumed herein to be formed of sheet steel having a thickness of $\frac{1}{8}$ inch. Using such heavier material, the total weight, m, of the float will be 288 lbs. Utilizing the above-derived force, $F_B$, and the latter mass value, m, the acceleration, a, becomes 175 ft./sec.$^2$. Recalling the selected terminal velocity of 6 ft./sec., then the time t to accelerate to a velocity of v of six ft./sec. becomes:

$$t = v/a = 6/175 = 0.0343 \text{ sec.} \tag{7}$$

The above hesitation time, t, represents a mere 3.4% of the total rise time of float 10 and, therefore, may be considered negligible for the analysis at hand.

Figure 6:
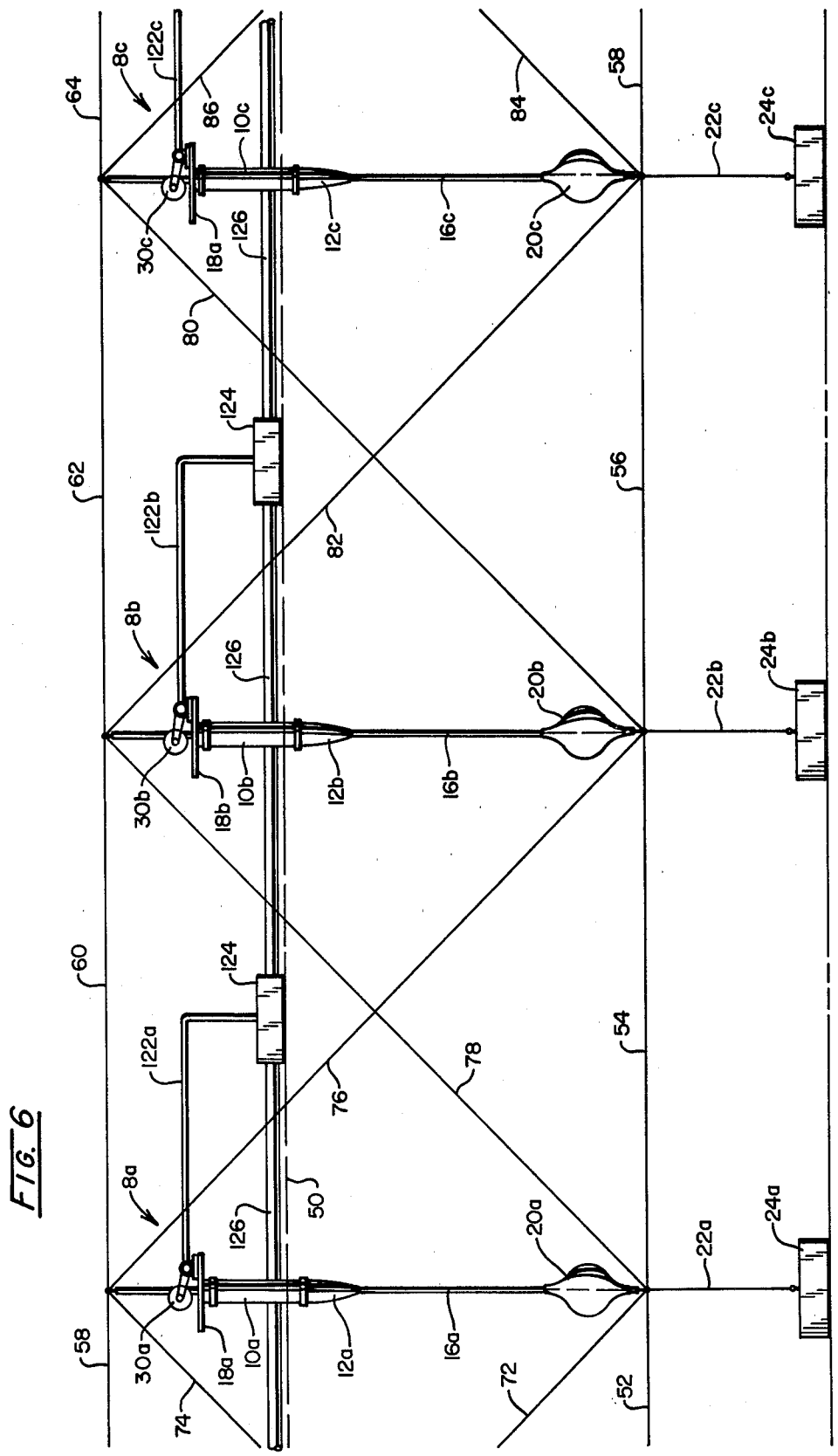
FIG. 6 is an idealized elevational view of one embodiment of the system of the invention.
Figure 7:
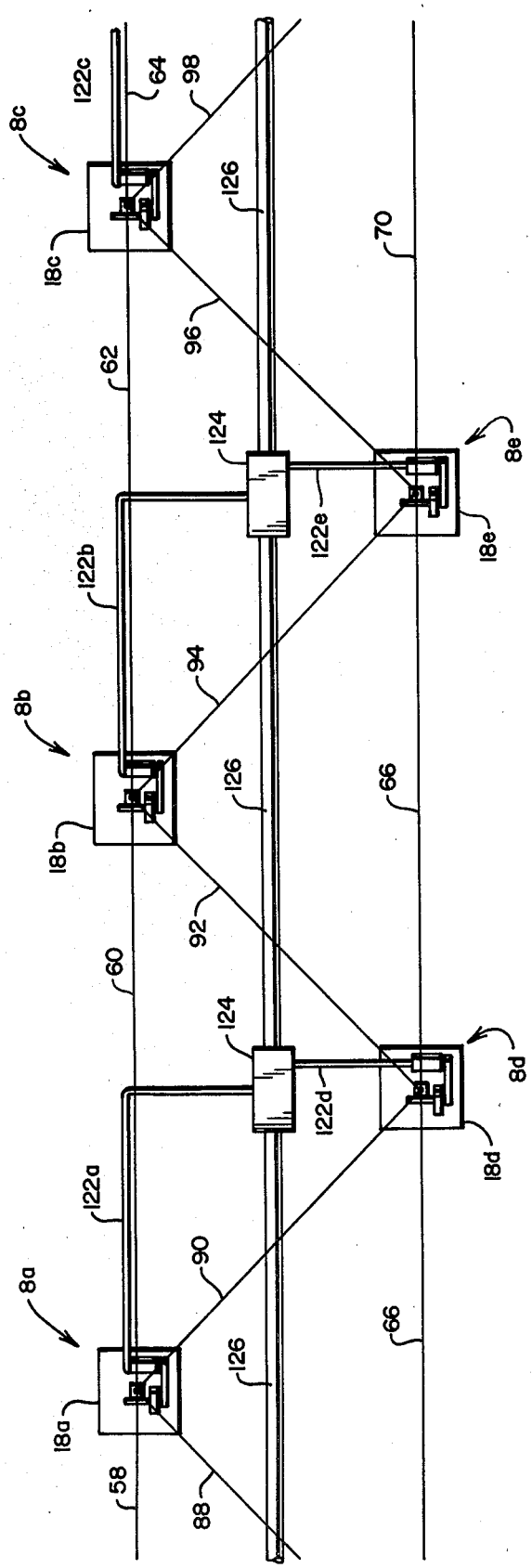
FIG. 7 is a top view of the arrangement of FIG. 6.

Looking now to an embodiment of the inventive system wherein a plurality of floats are positioned within a principal body of water suited for wave energy conversion, reference is made to FIGS. 2, 6 and 7. FIGS. 6 and 7 reveal a plurality of assemblies 8 (i.e. 8a, 8b, 8c, 8d and 8e) which initially have been described in connection with FIG. 2. These assemblies 8 are structurally interconnected in an elongated dual row form and are somewhat permanently affixed to the bottom of the water body. In most applications, the location of the inter-connected assemblies 8 will be selected so as to achieve energy extraction from deep-designated waves while remaining a practical distance from the terrestrial shoreline. By such selection, the more destructive effects occasioned with shallow wave disintegration are avoided. An additional consideration in the selection of the location is involved with the regularity (i.e. periodicity) of the waves as well as their average wave height, it being more preferable to locate the energy conversion system at a point where wave height remains somewhat consistent over a significant portion of the interval of operation. The arrangement shown in the subject figures is composite in nature, being formed of recurrent assemblies 8 thus far partially described in connection with FIG. 2. Accordingly, where common components are involved, identical numeration with varying alphabetical subscripts is used for describing correspondingly repeating components.

FIG. 6 shows an elevational view of the interconnection of assemblies 8a–8c, float arrangements 10a–10c and associated posts 16a–16c being vertically supported by stabilizing floats 20a–20c and guy wires arranged so that the floats may be maneuvered by the waves about mean sea level as that level varies with tide fluctuations and the like. For reference purposes, such mean sea level is represented by line 50. To provide horizontal and vertical support for posts 16a–16c along the longitudinal direction of the composite assemblage, horizontal cables 52, 54, 56 and 58 are so coupled as to interconnect the lower portions of stabilizing floats 20a–20c. Additional horizontal support is provided across the uppermost extending portions of posts 16a–16c by correspondingly upwardly disposed horizontal cables 58–64 as represented in FIG. 6 as well as at 66–70 which are shown in FIG. 7 as providing horizontal support across the tops of posts 16a and 16e. It will be understood, of course, that the number of assemblies as shown in FIG. 2 incorporated within a composite arrangement thereof will depend upon the anticipated operational desires of the designer. Tensional "X" bracing also is revealed in FIG. 6 as including cables 72–86 which serve to provide an enhanced vertical and horizontal rigidity to the composite assembly. FIG. 7 additionally reveals the presence of angularly oriented interconnecting cables 88–98 positioned within the plane of top horizontal cables 58–70 and providing tensional transverse structural support. The arrangement shown, while providing for positional stability at a select location within the sea, additionally permits desirable flexibility of the system to accommodate for spurious directional wave effects and the like. The relative positioning between assembly posts 16a–16e is predicated upon a predetermination of the average wave period at the situs of the conversion system. Additionally, while the composite arrangement shown can be longitudinally aligned with the direction of a given wave front, a preferred arrangement provides for a "broadside" confrontation to such given wave front. The latter orientation selection stems from a consideration that energy is removed from the waves in progressive fashion when the composite assembly is arranged to longitudinally confront the wave front. Assembly floats 10a–10c in FIG. 6 are shown at the same relative elevation with respect to mean sea level 50. However, it should be understood that, in actual practice, they will assume varying vertically disposed positions in dependence upon their operational attitude with respect to any given wave crest or trough.

Figure 8:
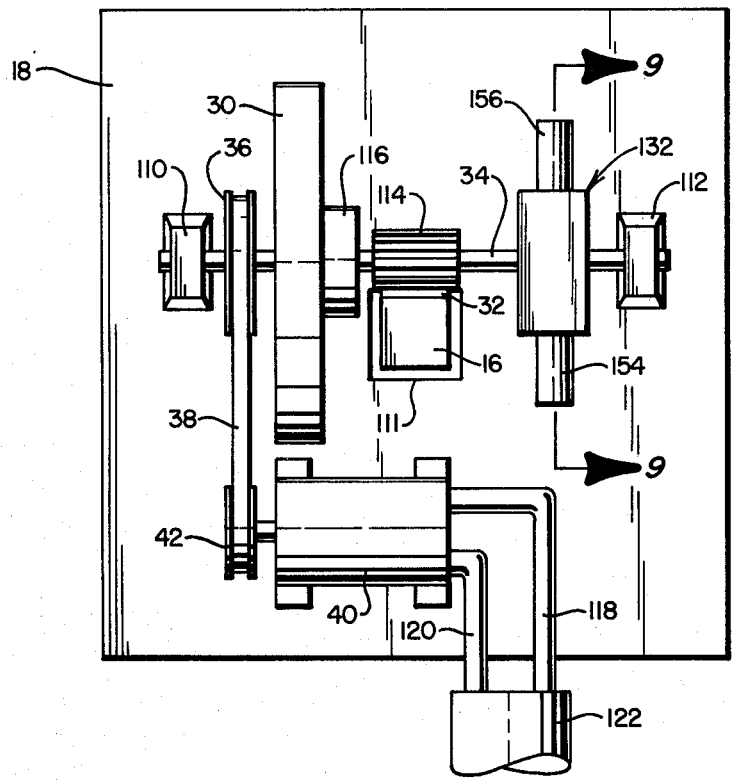
FIG. 8 is an enlarged top view of one float component of the arrangement of FIGS. 6 and 7.
Figure 9:
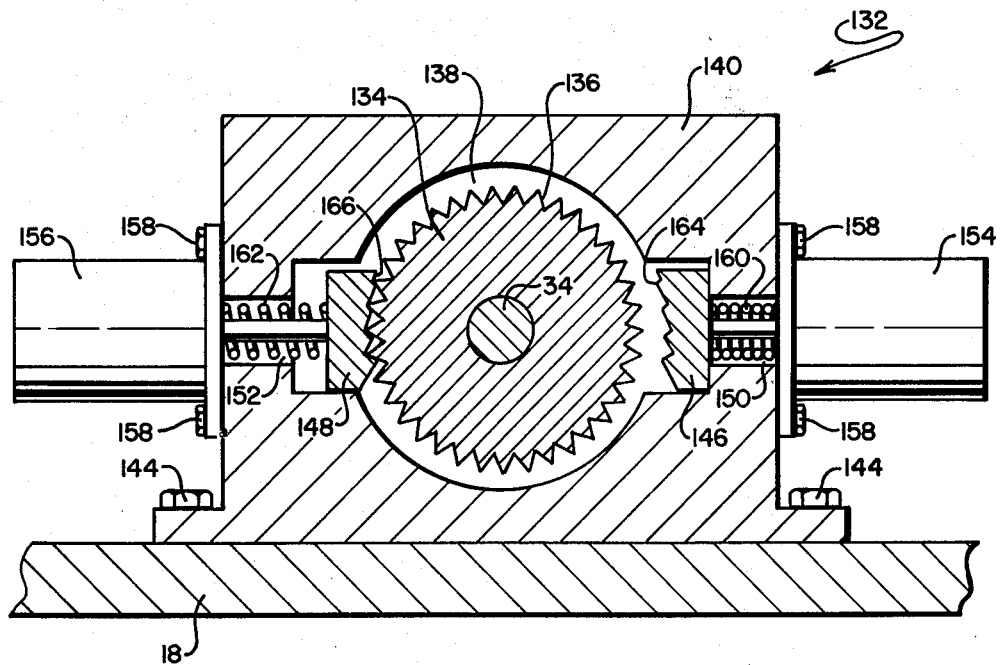
FIG. 9 is a sectional view of a pawl-type interceptor, the section being taken partially through the line 9—9 of FIG. 8.

Looking now to FIGS. 8 and 9, an arrangement for actuating the float 10 in accordance with the teachings of the invention as well as for converting the vertical buoyant movement of the float to a communicable energy form are revealed in more detail. Platform 18, affixed to the top portion of a given float 10, may assume a variety of geometric configurations; however, the platform is formed having a centrally disposed aperture of square profile shown at 111 (FIG. 8). As indicated earlier herein, platform 18 rides upon float 10 and both the platform and float are vertically supported and oriented by columns or posts 16 in the course of their wave induced oscillation. Axle 34 is shown in FIG. 8 as being journaled for rotation between two supports 110 and 112. As described earlier, pulley 36 as well as flywheel 30 are rotatably mounted and fixed to axle 34 in addition to the pinion 114 of a rack and pinion assembly including rack 32 formed upon the upward portion of column 16. As is apparent, with the elevation of float 10 and platform 18 from a presubmerged orientation, pinion 14 is rotatably driven to, in turn, impart rotation to axle 34. This rotation, in turn, is transmitted through a one-way clutch assembly 116 to axle 34 and arranged in unidirectional driving relationship with flywheel 30. With the arrangement, flywheel 30 is driven only upon the upward movement of platform 18. During downward motion of the assembly, flywheel 30 is permitted to continue rotation to the extent of the energy imparted thereto. This energy is transmitted as rotational work through pulley 36, belt 38 and pulley 42. Pulley 42, in turn, drives a hydraulic pump 40 having an input coupled with a flexible conduit 120. Conduits 120 and 118 represent a portion of a closed hydraulic circuit retaining a fluid suitable for pressurization by pump 40. The conduits are retained within a protective flexible sheath 122 which extends to a shoreline installation designed for conversion of the pressurized output fluid to usable power form. Looking additionally to FIGS. 6 and 7, sheaths 122 are revealed with appropriate alphabetical subscript extending to buoyant connector housings 124. Housings 124 are arranged in serial fashion to support main input and output hydraulic trunk lines enclosed within sheaths 126 and extending to a shore area or stable platform adjacent the power generating system installation. The housings additionally serve to protect the interconnection of conduits 120 and 118 with these pump conduits. The shore situated installation (not shown) to which sheaths 126 and housings 124 extend includes a hydraulic arrangement, for instance a turbine, which is driven by fluid pressurized by pumps 40 to, in turn, drive generator arrangements and the like serving to develop the electrical or other forms of usable power ultimately provided by the system of the invention. It should be understood, of course, that the electrical generation can be derived at the situs of the assemblies 8 and transmitted to the shoreline by electrical power cables.

Returning to FIGS. 8 and 9, it may be recalled that the operation of the system involves the retaining of each float 10 at the elevation developed thereby upon emergence through a wave crest and the release thereof when the float is positioned substantially over a wave trough. This release permits the inertial acceleration of the float and attached assembly including platform 18 to drop through the trough portion of the wave to an extent representing a predetermined preloading or presubmergence. At this lowest level of descent, the float 10 and related assembly is retained mechanically in position until centered beneath a subsequent wave crest. The actuator brake arrangement for this activity is represented in FIG. 8 at 132 and in partial sectional fashion in FIG. 9. Looking to the latter figure, a ratchet-type wheel 134 having peripherally disposed teeth as at 136 is shown journaled over and fixed to axle 34. Wheel 134 is retained within the cavity 138 of a block-shaped housing 140. Housing 140, in turn, is fixed to platform 18 as by bolted connections, two of which are revealed at 142 and 144. Also situated within cavity 138 are pawl-type interceptors 146 and 148, respectively, fixed to drive rods 150 and 152 of corresponding solenoids 154 and 156. Solenoids 154 and 156 are fabricated in conventional fashion including windings (not shown) incorporated within externally mounted cylindrical body members which are fixed to housing 140 by bolts as at 158. Interceptors 146 and 148 are biased inwardly toward wheel 134 by respective coil springs 160 and 162.

Examining interceptors 146 and 148 in more detail, it may be observed that interceptor 146 is configured having detents 164 so configured as to lock against peripherally disposed teeth 136 when engaged therewith to prohibit clockwise rotation of wheel 134 as seen in FIG. 9. Such engagement, however, will not prohibit counterclockwise movement of wheel 134. Interceptor 148 is configured having detents 166 which when engaged with the peripherally disposed teeth 136 of wheel 134 as depicted in the drawings, will prohibit the counterclockwise rotation thereof. However, interceptor 148 will permit clockwise rotation of wheel 134 and axle 34. Interceptors 146 and 148 are selectively retracted from contact with wheel 134 by the energization of the windings of respective solenoids 154 and 156. In FIG. 9, interceptor 146 is shown retracted in consequence of the energization of the winding of solenoid 154, while interceptor 148 is shown in an extended position under the influence of spring 162, the winding of solenoid 156 not being energized.

In operation, as float 10 descends, wheel 134 will be driven from axle 34 in a counterclockwise direction as viewed in FIG. 9, i.e. viewed from pinion 114. During such maneuver, the winding of solenoid 156 is energized to retract interceptor 148, while the winding of solenoid 154 is de-energized to permit slideable movement of peripherally disposed teeth 136 against detents 164. As float 10 reaches its maximum depth within the body of water, it will tend to reverse direction and float upwardly. This minor reverse movement will be sensed at wheel 134 and peripherally disposed teeth 136 will lock in contact with detents 164. With such arrangement, float 10 is retained in the orientation shown and described at 10′ in connection with FIG. 1B. At an appropriate time when float 10 is oriented beneath the crest of a subsequent wave, the energization sense of solenoids 154 and 156 is reversed, solenoid 154 being energized as shown in FIG. 9, while the winding solenoid 154 being energized as shown in FIG. 9, while the winding solenoid 156 is de-energized. Such an energization arrangement will permit wheel 134 to rotate in a clockwise direction thereby permitting float 10 to rise to the orientation described earlier in conjunction with FIG. 1A. As float 10 ceases to rise, it will be locked in position by virtue of the engagement of detents 156 with peripherally disposed teeth 134. The cycle then repeats itself with respect to a succeeding wave. It has been determined empirically that adequate presubmergence is achieved with the inertial forces generated through dropping float 10 as described hereinabove.

To properly control the energization of solenoids 154 and 156, a wave crest and trough prediction arrangement is provided. Of course, many different mechanisms and systems may be utilized to provide such logic, one arrangement being shown in detail in connection with FIGS. 2, 10 and 11. Looking to FIG. 2, a vertically oriented sounding tube is shown at 170 spaced from and in coaxial relationship with float 10 and cloumn 16. Connective association between float 10 and tube 170 is provided by brackets 172 and 174. Brackets 172 and 174 are vertically fixed with respect to float 10, but are pivotal about the central axis thereof. Additionally, the brackets serve to space tube 170 a predetermined distance from the central axis of float 10. A vane as at 174 may be fixed to the lower portion of tube 170. Vane 176 provides for the alignment of tube 170 with the direction of the wave front encountered by assembly 8. Tube 170 descends and ascends in complement with float 10, and is hollow and open at its uppermost and lowermost ends so that the instantaneous water surface level is present within tube 170 and is altered in correspondence with the instantaneous vertical orientation of float 10. Looking to FIGS. 10A and 10B, the wave crest and wave trough prediction function of sounding tube 170 is schematically portrayed. The tube is shown in FIG. 10B with respect to an idealized wave form 178 having a direction of movement shown by an arrow. The arrangement of FIG. 10B is one wherein the control logic of the system is about to command the above described actuating mechanism to release float 10 for inertially derived submergence of other forms of submergence and preloading at the inflection point of a wave trough. Prediction of the location of the trough through the use of sounding tube 170 is provided through the utilization of four float and/or flow actuated switches 182, 184 186 and 188 mounted within tube 170. To simplify the discussion of the operation of these switches, when they are not influenced by the water level or flow within tube 170, the switches will assume a gravitationally derived downward orientation which is given the binary designation "0". Conversely, when the water elevation within the tube 170 rises, the floats and/or water flow will throw the switches to an upward orientation which orientations are herein given the binary designation "1".

FIG. 10B represents an instantaneous situation in which wave 178 has developed a trough centered beneath float 10. In the course of formation of this trough, the water level within the sounding tube will have dropped so that each of switches 182, 184, 186 and 188 will have converted from a 1 to a 0 condition essentially as the crest of the preceding wave passes the assembly. As the trough of wave 178 approaches the axis of float 10, switch 188 is positioned within the tube 170 so as to assume a "1" condition at a water level just above the inflection point of a wave trough and this condition is represented in FIG. 10B. Looking to FIG. 11A, which is a truth table showing switch condition, logic for a Drop Command, i.e. preloading, is provided. The figure also reveals the state of energization of the windings of solenoids 154 and 156. In the latter regard, an energized state is represented by a "1" while an unenergized state is represented by a "0". Looking additionally to FIG. 11B, two multifunction gates 190 and 192 are schematically represented having inputs corresponding with switches 182-188. These inputs are represented in the drawing by the switch number primed. The outputs of gates 190 and 192, respectively, are present at lines 194 and 196. Line 194 serves to command the energization and de-energization of the winding of solenoid 156 through an appropriate power circuit as represented by block 198. Similarly, line 196 provides energization commands to the winding of solenoid 154 through a power circuit as represented by block 200. The selection of the particular design of multifunction gates 190 and 192 is made under conventional practice utilizing the logic of the truth table of FIG. 11A.

Figures 11A, 11B:
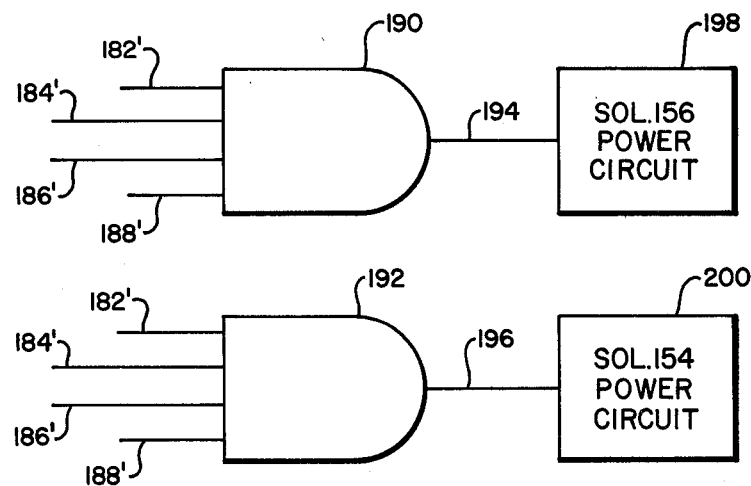
FIG. 11A is a truth table showing the binary logic output of the switches of FIGS. 10A and 10B.
FIG. 11B is a schematic representation of a control circuit utilized in connection with the truth table of FIG. 11A.

As represented in FIG. 11A, a Drop Command is carried out by effecting the energization of the winding of solenoid 156 upon the conversion of switch 186 to a "1" condition. The winding of solenoid 156 is energized, while that at solenoid 154 is de-energized and float 10 is permitted to drop at the wave trough site. As shown in the next succeeding operation in the table of FIG. 11A, during this dropping procedure, switch 186 will convert to a "1" state; however, the winding of solenoid 156 remains energized. As float 10 reaches the lowermost orientation, identified by the label "Submerged Retention" in FIG. 11A, switch 184 will convert to a "1" condition; however, the winding of solenoid 156 remains energized. Switch 182 remains in an "0" state being positioned to be actuated upon the elevation of water in tube 170 to a point just below a wave crest height. When this condition obtains, as shown in FIG. 10A, switch 182 converts to a "1" state as represented by the label "Release Command". With this logic condition, the winding of solenoid 156 is de-energized, while that at solenoid 154 is energized. Float 10 then commences to rise toward the crest of the wave. As represented under the operational lable "During Elevation", as tube 170 rises, all switches therein assume a "0" condition providing logic to maintain the energization of the winding of solenoid 154. As the assembly reaches a peak elevation, it is retained, pending a next "Drop Command". This retention is represented by the operational label "Elevated Retention" in FIG. 11A, switches 182, 184 and 188 having a "0" state.

Figure 12:
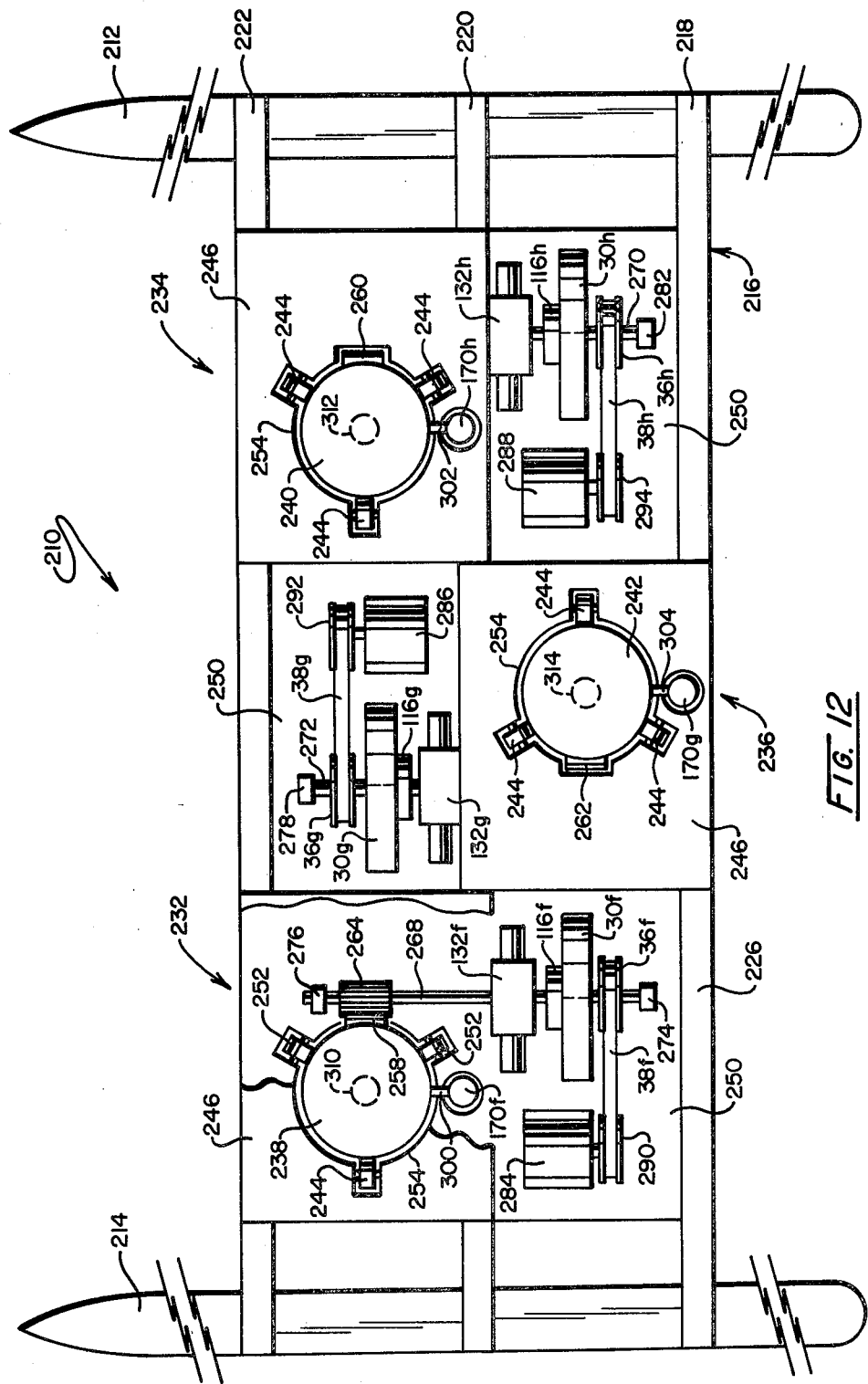
FIG. 12 is a top view of another embodiment of the invention, with components of still another conversion embodiment additionally being shown thereon in phantom.
Figure 13:
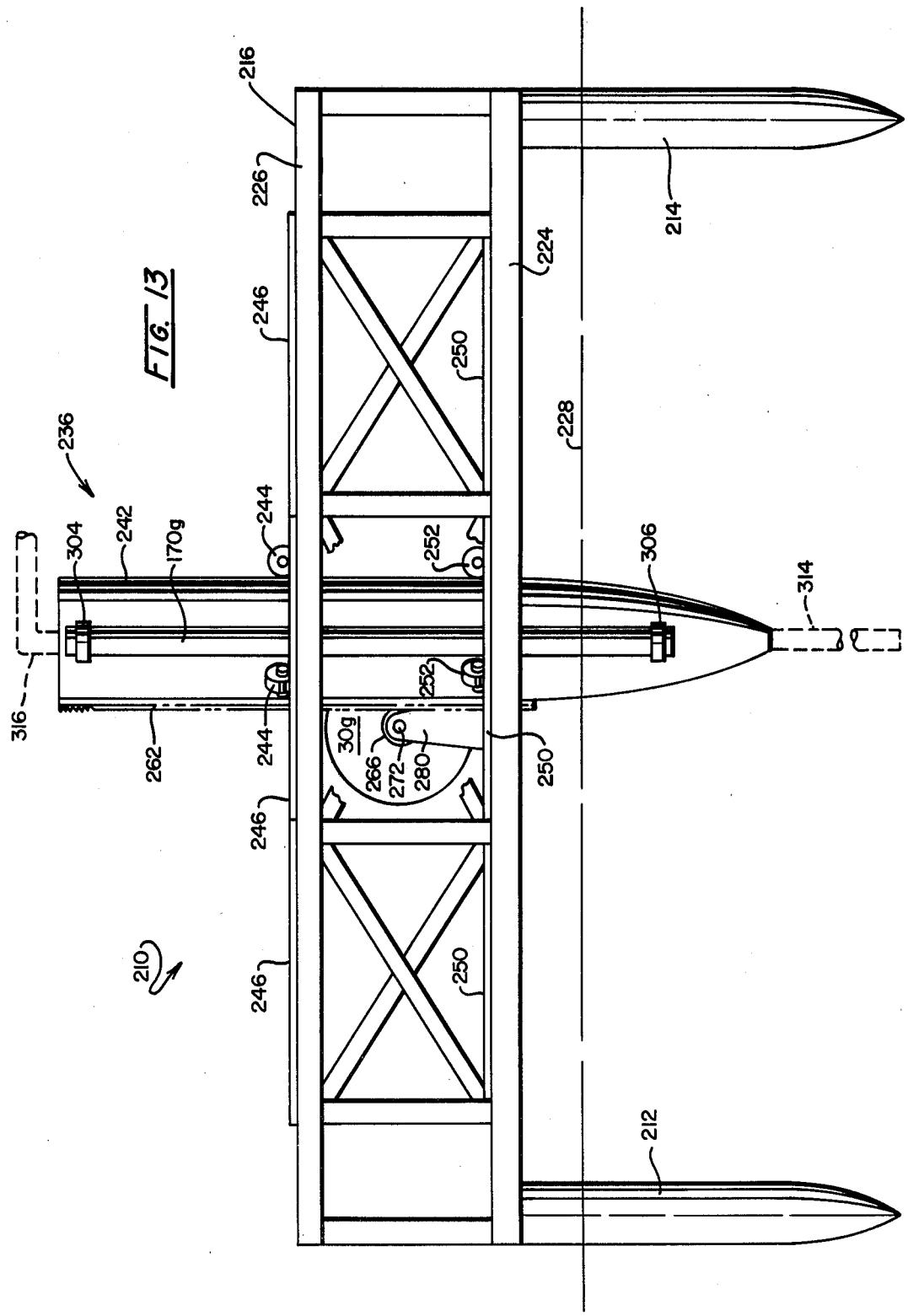
FIG. 13 is an idealized elevational view of the arrangement of FIG. 12.

As discussed above, the system of the invention is utilized in conjunction with some form of stable platform or support. This platform or support may take the sea floor anchored column arrangement of the embodiment described above; may, for example, utilize the stability present in an offshore drilling platform or the like, or as shown in FIGS. 12 and 13 may utilize a form of pontoon or flotational support. Referring to the latter figures, the platform arrangement is represented generally at 210 as incorporating two elongated hydraulically shaped hulls or pontoons 212 and 214. These pontoons have a height, as revealed in FIG. 13, selected as being larger than a mean wave height within a sea region of contemplated performance and a length sufficient to provide platform stability. In the latter regard, their length will be on the order of about three of the noted wavelengths or longer. Pontoons 212 and 214 are structurally coupled with each other in spaced parallel relationship by a superstructure 216 formed of a series of these trusses 218, 220 and 222. These trusses are fashioned under conventional structural design criteria and are rigidly interconnected to provide appropriate vertical and parallel orientations of pontoons 212 and 214 as well as to support the floats and actuator components of the system of the invention. Superstructure 216, by virtue of the upper and lower chords of each truss as shown, for example at 224 and 226 in FIG. 12, provides for two spaced deck elevations positioned well above mean sea level as represented by line 228.

The embodiment depicted in the figures incorporates three float assemblies 232, 234 and 236. These assemblies utilize a preloading arrangement identical to that described above. Accordingly, where the same actuator and power components are represented in the instant embodiment, they are identified with the same numeration as utilized earlier herein with respective alphabetical suffixes f, g and h. The floats 238, 240 and 242 within respective assemblies 232, 234 and 236 are represented as being dimensioned somewhat similarly to floats 10 described earlier. In this regard, note that they are somewhat elongated having an ellipsoidal taper at their lowermost portion, that portion representing the static buoyancy portion described earlier at 12. As revealed more clearly in FIG. 13, each of the floats is supported for vertical movement between the noted superstructure decks by freely rotatable rolls 244 as mounted within upper deck 246 and in the same manner within lower deck plates 250 by freely rotatable rolls 252. Note additionally, that both upper and lower deck plates 246 and 250 are formed having openings as at 254 in upper deck plate 246 through which floats 238–242 and attachments thereto may move in carrying out an energy generating function.

The actuating arrangement for the floats is similar to that described earlier at 132 (FIG. 8). In the present embodiment, however, elongated racks as at 258, 260 and 262 are fixed in coaxial alignment with the side surface of respective floats 238, 240 and 242. These racks are operatively associated with corresponding pinions, one such pinion being shown in FIG. 12 at 264, associated with rack 256, and another being revealed in FIG. 13 at 266 associated with rack 262. The pinions within float assemblies 232, 234 and 236, in turn, are journaled over and fixed to respective axles 266, 270 and 272 which extend between supports mounted upon the lower deck plates 250. In the latter regard, supports 274 and 276 rotatably support axle 268, support 278 and a similar support (not shown) support axle 272, and similar supports (one of which is shown at 282) support axle 270. Each of the axles also cooperate with an appropriate one-way clutch assembly 116f–116h, flywheels 30f–30h and actuator assemblies 132f–132h. With these associated components, the actuating arrangement and energy conversion can be carried out. In the latter regard, output pulleys 36f–36h may be utilized to drive belts 38f–38h to an appropriate conversion unit. These units are shown as electrical generators 284, 286 and 288 coupled through respective pulleys 290, 292 and 294 to belts 38f–38h.

As in the earlier embodiment, wave form prediction is carried out by sounding tubes as at 170f–170h which are rigidly coupled to respective floats 238, 240 and 242 by upwardly disposed brackets shown respectively at 300, 302 and 304 and lower brackets, one of which is shown in FIG. 13 at 306.

Figure 14:
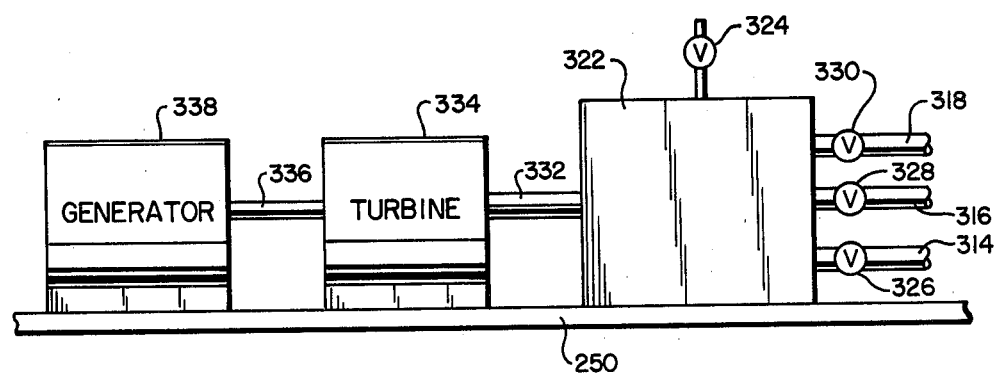
FIG. 14 is a partial schematic elevational view of components utilized with the alternative conversion arrangement shown in phantom in FIGS. 12 and 13.

FIGS. 12, 13 and 14 also show an alternative form of energy conversion which may be utilized with the preloading system of the invention. For example, in FIGS. 12 and 13, elongated tube pump type conduits 310, 312 and 314 are shown extending through and fixed to floats 238, 240 and 242. As shown in FIG. 13, these floats extend downwardly into the water to a depth predetermined inaccordance with desired energy energy extraction. The conduits also incorporate a flap-type check valve (not shown) at an upper level of each of the floats and a flexible connecting conduit revealed in phantom at 316 in FIG. 13 as extending from tube 314 as well as at 316 and 318 in FIG. 14, the latter conduits extending respectively from tubes 310 and 312.

FIG. 14 schematically reveals the additional components required with the instant alternative conversion technique. The components thereof would be mounted upon upper deck plates 250 between floats 238 and 240 and adjacent to float 242. Shown in the figure is a large box-shaped accumulator tank 322 having a constant pressure valve 324 communicating internally therewith and mounted at its upper surface. Conduits 314, 316 and 318 are connected with the tank through respective check valves 326, 328 and 330. An output line from accumulator 322 is shown at 332 in driving input communication with a turbine 334. The output of turbine 334, in turn, is schematically portrayed at 336 communicating in driving relationship with an electrical generator 338.

The conventional operation of tube pump arrangements as shown is known and is described, for example, in *Ocean Engineering*, Vol. 3, pp. 175–187, Pergamon Press, 1976, Great Britain. As may be observed, tubes 310, 312 and 314 oscillate in unison with their associated floats. During such oscillation, the water entrained within each tube is permitted to rise freely therewithin by virtue of the provision of the earlier-noted check valves within the tubes. However, the water is not permitted to move downwardly with respect to the tubes and floats. As a consequence, the entrained water tends to match the motion of each float as long as the acceleration of the float is greater than that of the entrained water. As the acceleration of the float drops below that of the water column, the water will rise and will continue to flow upwardly relative to the float until its velocity becomes negative with respced to the float. The outwardly passing water then is introduced under developed pressure through flexible input pipes 314, 316 and 318 and their associated check valves to accumulator tank 322. The pressure head developed therein then is bled from output line 332 to drive turbine 334.

By applying the same wave form parameters as described in the discussion of FIGS. 3 and 4, assuming the utilization of a two hundred foot length for a pipe is at 310, 312 and 314, as well as an eight inch internal diameter thereof, the arrangement of this embodiment may be modeled as a spring-mass system which may be shown to develop at least comparable net work output values as are shown in connection with FIG. 4. Preferably, however, an active as opposed to passive presubmergence technique is recommended to improve the rapidity of moving the float assemblies to their selected presubmergences orientation. The power required for carrying this out may be developed from the work output of accumulator tank 322.

In all the embodiments described above, energy is derived from the flotational or upward movement of the float as it moves subsequent to its release from beneath the crest of a wave. The invention also contemplates an arrangement wherein energy may be extracted during the gravitationally induced downward movement of the float toward the trough of a wave. Recall that in one arrangement, preloading of the float beneath the surface of the wave is enhanced by dropping the float from a position wherein it is aligned with a trough such that the momentum of its' dropping carried out a predetermined preloading submergence beneath the water surface defined by the trough. The energy potential realized by this gained submergence and subsequent flotational drive upward beneath a crest need not be entirely removed by conversion to communicable energy i.e. electricity or the like. For example, a portion of the available energy may be used to permit the float to move above the crest under flotationally induced momentum a predetermined distance, whereupon it again is locked pending positioning over a subsequent trough. The amount of energy removed during flotational upward movement will determine the extent which the float so moves under momentum to the elevated level.

Generally, an adjustment to optimum performance of the float may be achieved by delegating a predetermined amount of energy removal both in the gravitational downward movement and the flotational upward movement to the preloading feature.

Figure 15A:
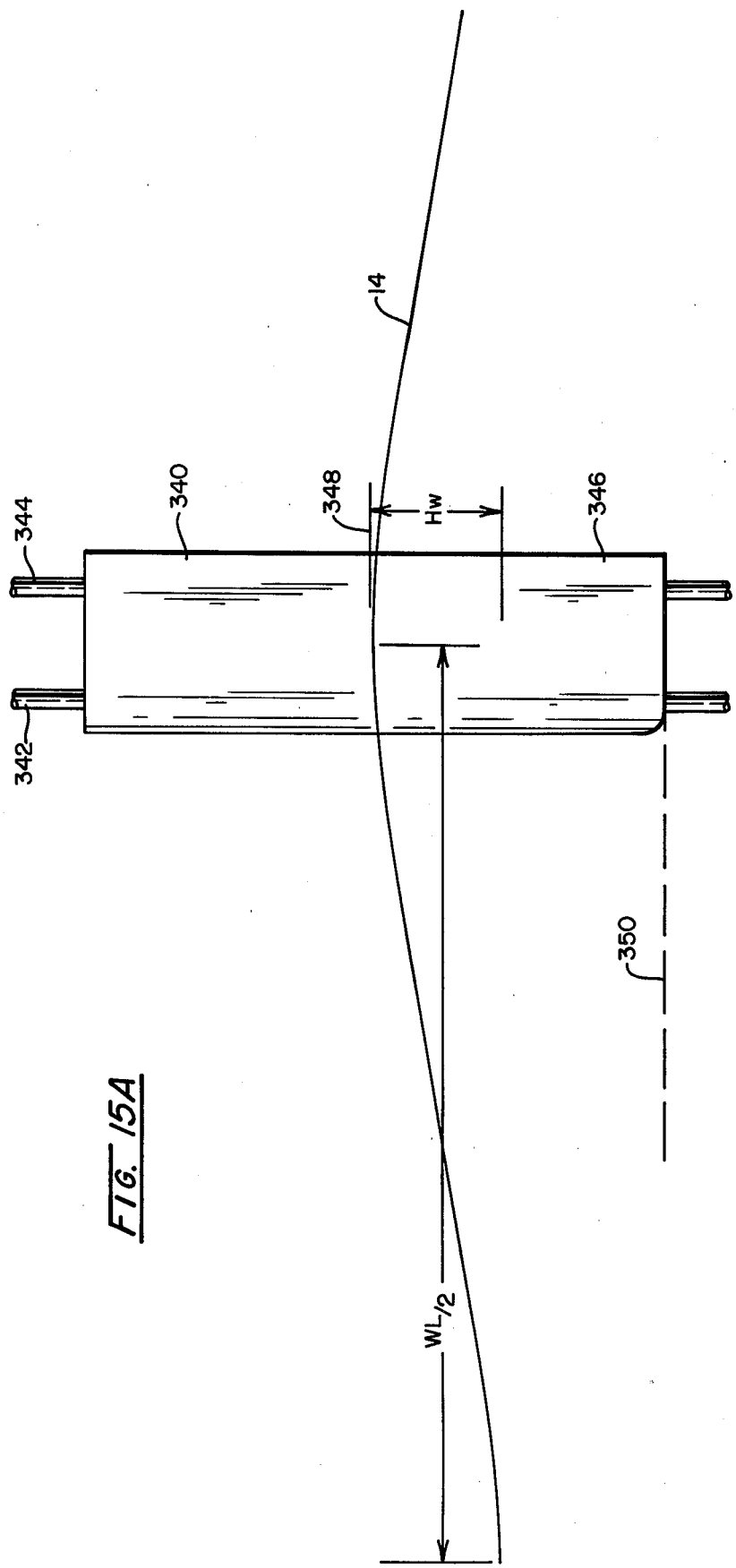

Referring to FIGS. 15A–15D, an elongate float 340 is depicted in the various orientations which it will assume with respect to a wave form 14 in the course of its performance with respect to the instant embodiment. Looking to FIG. 15A the float 340 is revealed having an upper surface fixedly attached to an elongate structure including two vertically extending rods 342 and 344. The particular interaction of these rods as well as the structure of float 340 within a battery thereof is described in connection with later figures. As in the case with FIGS. 1A–1C, the wave 14 is depicted having a height "Hw", a length "WL" and a conventionally encountered steepness ratio of about 1-to-7. FIG. 15A is provided to illustrate reference positions or orientations and levels so as to more clearly depict the performance of float 340. In this regard, the static buoyancy portion of the float is represented at 346 positioned below an equilibrium line 348. Thus, float 340 will float at the level 348 shown in a quiescent state without the influence of preloading or the momentum of flotational drive. The figure further reveals that the bottom of float 340 is at a level depicted by dashed line 350.

Turning now to FIG. 15B, the float 340 is depicted in the course of its gravitational descent into the trough of waveform 14. The solid line designation of the float is at an orientation and elevation identical to that revealed in FIG. 15A. However, float 340 now is moving downward under the impetus both of the potential energy represented by one wave height, $H_w$, as well as the momentum achieved in movement while being dropped from a higher elevation, which is represented as "$P_{sm}$". The total energy available to the float is represented in the drawing as $P_s$, i.e. potential submergence. Under the theory of the instant embodiment, energy will be removed from float 340 during its downward progress. The float will reach the depth represented at dashed line 352 and will have the orientation represented at 340'. In the latter orientation, the equilibrium line 348, as represented in FIG. 15A, moves to the position designated 348'. Float 340 is locked in te orientation and at the depth represented by dashed outline 340' until wave 14 develops a crest substantially aligned over the vertical axis thereof.

Turning to FIG. 15C, the restrained or blocked position of float 340 described in FIG. 15B again is represented in dashed form at 340' as extending to depth 352 and having an equilibrium line positioned at 348'. From position 340', the float may be released for flotationally driven movement vertically upwardly and during that movement work is taken from the float and converted to communicable energy. For example, all of the energy might be removed such that the float again assumes the orientation of FIG. 15A wherein its equilibrium line would coincide with the wave crest surface as again indicated at 348. However with the instant embodiment, not all of the work available from the float is removed and that which is not so removed is imparted to the float as momentum, causing it to elevate above wave crest 14 such that the equilibrium line of the float assumes the elevation represented at 348". As a consequence, the float assumes the solid line orientation or elevation as represented at 340". Note, that the drawing indicates that an upward preloading $P_{sm}$ is developed which represents a potential energy for the float over and above the total preloading potential otherwise available and represented as: $P_s$. For illustrative purposes, the extent of momentum preload, $P_{sm}$, shown in FIG. 15C is equivalent to the amont of preload designated in FIG. 15B. As is apparent, by removing less energy from the float 340 during it's movement through a crest, a greather degree of momentum-derived elevation from the crest of the wave is achieved which is translated into more available work to be taken out during the subsequent dropping of the float. Generally, it is opined that the amounts of such energy removal for the upstroke as well as the downstroke of the float should be equalized.

Turning to FIG. 15D, the locked upward orientation of the float again is represented at 340" and waveform 14 has developed a trough in alignment with the float. In this orientation, the total potential submergence, $P_s$, is shown to represent the potential energy of a wave height, $H_w$, plus the potential achieved from the earlier described momentum, $P_{sm}$. From the orientation shown, the float is released to commence downward movement, during which work is converted to communicable energy.

Turning to FIG. 16, a general overview of a water borne structure supporting a plurality of floats as described at 340 is revealed generally at 360. The uppermost portion of the structure 360 is not shown in the drawing in the interest of clarity but is described in detail later herein. Structure 360 is provided as a framework having two elongate spaced truss components 362 and 364. Components 362 and 364 are structurally engineered such that, when partially submerged, they extend between and are supported from oppositely disposed elongate floats. In this regard, the floats supporting truss component 362 are shown at 366 and 368 in an orientation wherein their upper surfaces are positioned against the upper structural pipe member 370 of truss 362. Similarly, floats 372 and 374 are positioned just beneath the upper structural pipe member 376 of truss 364. Truss components 362 and 364 are spaced with respect to each other by a series of cross braces (not shown) and serve to support a superstructure, shown generally at 378, as well as a substructure, shown generally at 380. Note, that superstructure 378 is comprised of a plurality of horizontally disposed truss members, certain of which are identified at 382, which are supported by upstanding columns, certain of which are revealed at 384 extending from and fixed to upper structural pipe member 376, as well as at 386 extending from and fixed to upper structural pipe member 370.

Substructure 380 is formed of a plurality of cross members, certain of which are identified at 388, and which are supported by downwardly depending columnar components, certain of which are revealed at 390 extending from lower structural pipe member 392 of truss component 362 as well as at 394 extending from the lower surface of pipe member 396 of truss component 364. Further detail of the fabrication of structure 360 is provided in connection with FIGS. 17-19.

Extending between and supported from superstructure 378 and substructure 380 are two parallel lines of tandemly oriented floats 400 and 402. The floats within lines 400 and 402 are configured as described in connection with FIGS. 15A-15D and each acts independently of the other but in synchronism with wave motion to generate power. With respect to the dimensions involved, the structure 360 may have a lengthwise extent of about 500 feet, a length generally corresponding with the wave length of an average swell.

Looking to FIG. 17, an end view of the structure 360 showing the initial wave confronting floats 340a and 340b within respective lines of floats 400 and 402 is provided. Floats 340a and 340b are shown fixed to respective forwardly disposed rods 342a and 342b which, in turn, are slideably supported within substructure 380 by respective bearings 404a and 404b coupled to a cross member 388. Similarly, the rods 342a and 342b are slideably supported by corresponding bearings (not shown) formed within platform plates or floor components 406 and 408 which are positioned, respectively, at the upper and lower surfaces of the horizontally disposed truss members as at 382. FIG. 17 further schematically reveals an anchoring system for the structure 360 including anchor cables 410, 412, 414 and 416 extending from the structure to an anchor arrangement 418. The particular type of anchoring utilized in connection with the structure will depend upon the environmental conditions within which the system is operated. Inasmuch as the mechanisms and structures of the power floats within parallel rows thereof 400 and 402 are identical, the same numeration is used within FIGS. 17-20 to identify identically operated components. Further, the suffix a or b is added to the numeration utilized in connection with FIGS. 15-16 to identify components within respective parallel rows of floats 400 and 402. FIGS. 17-20 also reveal a preferred actuator and energy conversion arrangement utilized with the operation of floats 340.

In general, the energy conversion technique of the instant embodiment is one wherein the upward and downward movement of the power floats 340 is used to unwind a high tensile strength band or cable from a drum. Such cables are characterized in being flexible, but substantially non-deformable when in tension. The drum, in turn, operates through a unidirectional clutch to drive a drive shaft which, in turn, drives a generator or the like through a flywheel. On any vertical stroke portion of the floats wherein the band is not withdrawn from the drum, the band is rewound thereupon, for example, utilizing a weighted cable. To provide stress compensation in the structure 360 in the embodiment illustrated in connection with FIGS. 16-20 successive pairs of adjacent floats 340 are operated such that energy conversion takes place during mutually opposite movements of floats 340. For example, a first pair of floats 340a, 340b will generate removable work on a downstroke, while a next succeeding pair of floats are configured for the removal of work on an upstroke.

Figure 19:
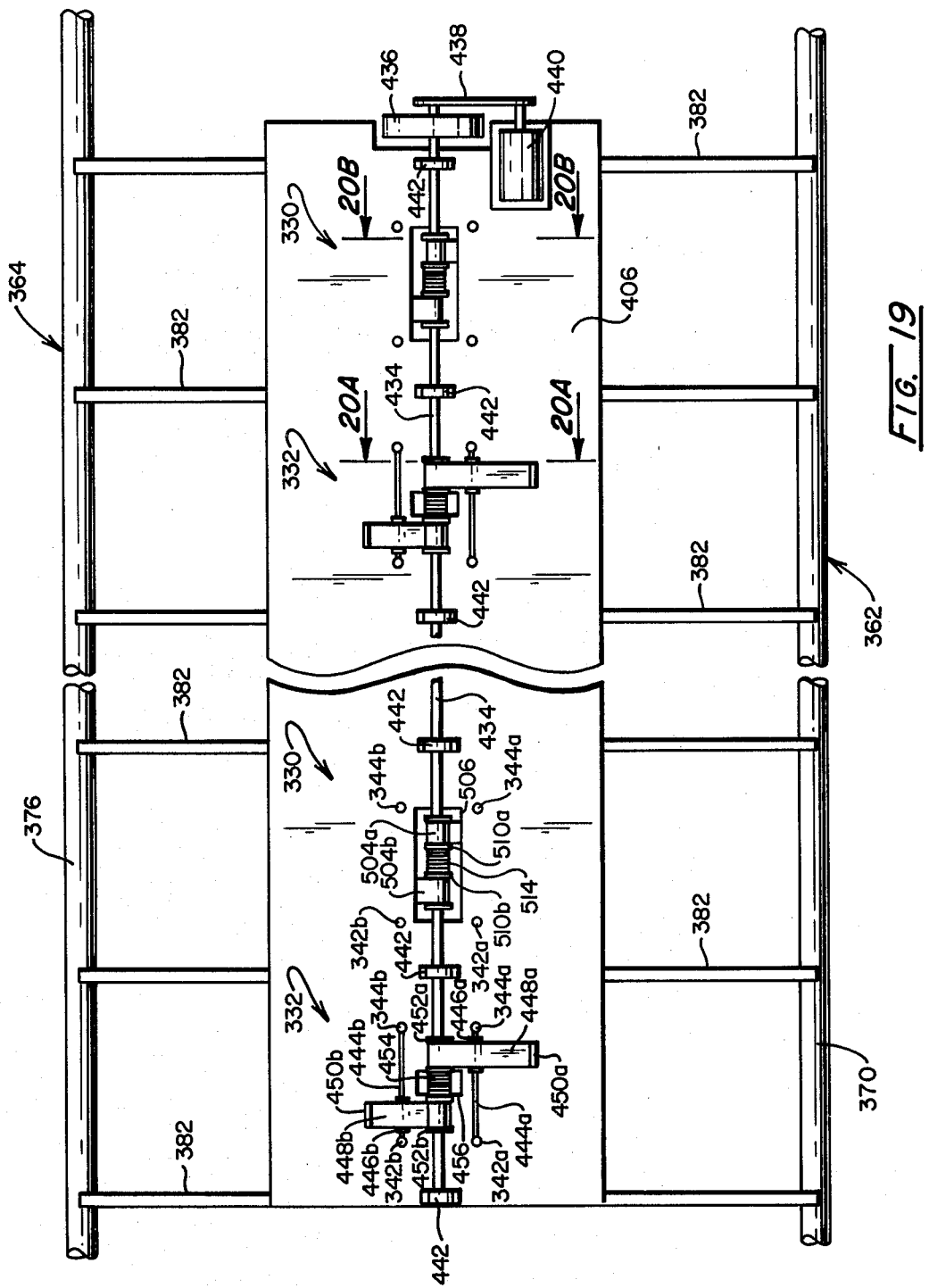
FIG. 19 is a partial top view of the embodiment of the invention represented by FIG. 16.

FIG. 17 reveals a tandem pair of floats 340a and 340b having actuator and conversion mechanisms intended for the removal of work from the system as these floats descend into a wave trough, as well as corresponding mechanisms for work removal during flotational movement of aligned floats within lines 400 and 402. FIGS. 18 and 19 reveal these oppositely acting actuation and conversion mechanisms for removing and converting work from the floats 340 generally at 430 and 432. The figures further reveal a centrally disposed drive shaft 434 extending to a flywheel 436. As shown in FIGS. 17 and 19, a drive velt mechanism 438 extends from a corresponding pulley (not shown) attached to the drive shaft 434 outwardly of flywheel 436 to a corresponding pulley drive input to an electric generator 440. A singular drive shaft 434, pulley 436 and generator 440 are depicted in the drawing in the interest of simplicity, discrete series of shafts, flywheels and generators being contemplated within the purvue of the invention, as opposed to one elongate arrangement as depicted. Further other conversion techniques as discussed above are applicable to the instant embodiments. Shaft 436 is supported along its length by a series of pillow block like bearings 442 which, in turn, are attached to platform 406.

In view of the alignment of the components lengthwise along structure 360, the view shown in FIG. 17 of the conversion and actuator features necessarily shows components of both mechanisms 430 and 432. Thus, for clarity in describing each separately, reference initially is made to FIGS. 18, 19 and 20A for a consideration of mechanism 432 wherein work is removed in consequence of the flotational upward movement of floats 340a and 340b. In this regard, FIG. 19 reveals the presence of horizontally disposed support rods 444a extending between the uppermost end portion of rods 342a and 344a, while similar, horizontally disposed rods 444b extend between corresponding rods 342b and 344b. Support rod 444a carries a freely rotatable pulley or idler roll 446a, while, in similar fashion, support rod 444b carries an idler roll or pulley 446b. This structure obtains for each of the systems 432 wherein work is removed in the course of flotational upward movement of the float generally designated 340.

Inasmuch as the actuation and conversion mechanisms for adjacent floats 340a and 340b are identical, the description thereof which follows incorporates the illustration of FIG. 20A, representing a particle sectional view of the mechanism associated with a float 348. Referring to that figure, it may be observed that the upwardly disposed surface of idler roll 446a is in contact with the corresponding lower surface of an elongate flexible band 448a, one end of which is anchored to upper plate or floor 406 by connector 450a. The opposite end of flexible band 448a is coupled to and wound about a drum assembly 452a mounted coaxially with drive shaft 434. Drum assembly 452a is associated in driving relationship with drive shaft 434 by a unidirectionally engagable clutch assembly of conventional structure (not shown) which engages shaft 434 upon the rotation of drum 452a in a clockwise direction in the sense of FIG. 20A. This clockwise drive thus is imparted to drum 452a upon the upward movement of rods 342a and 344a. As rods 342a and 344a descend to drop the float 340a coupled thereto into a wave trough, the band 448a is rewound upon drum 452a by a rewind assembly including a drum 454 shown in FIGS. 18 and 19 positioned above a rectangular opening 456 and connected to drum assembly 452a. One end of a cable 458 is attached to the rewind drum 454 and from that attachment extends through the opening 456 to pass about the underside of a freely rotatable pulley 460 to which is attached a weight 462. The opposite end of cable 458 is attached to connector 464 which, in turn, is fixed to bottom plate 408. With the arrangement shown, as band 448a is unwound from drum 452a, cable 458 is wound upon its corresponding drum 454. Weight 462 elevates in correspondence with the windup. Upon a subsequent actuation of the mechanism 432, rods 342a and 344b descend, whereupon windup drive is imparted to drum 454 and thence to drum 452a to rewind the belt 448a thereupon pending another elevation of float 340a and attached rods 342a and 344a.

As is revealed in FIGS. 18 and 19, the bands utilized at 448a and 448b are relatively wide and, while flexible, are capable of accommodating very high tensile stress without substantial deformation. In this regard, nylon, steel or glass reinforced webbing is suggested as an applicable material for this purpose.

FIG. 20A further reveals the actuator device 466 for locking and releasing rods 344a. This device is provided in identical fashion in connection with rods 342, 342b and 344b. As is apparent from the drawing, actuator device 466 may be provided as an eccentric friction grip or clutch incorporating pivot bars 468 and 470 coupled respectively to plate 408 through hinge connections at 472 and 474. Bars 468 and 470 respectively are biased outwardly by spiral springs 476 and 478. Each of the bars 468 and 470 further is configured having a principal aperture through which rods as at 344a extend and each incorporates a plurality of loosely connected engagement plates 480 and 482 which serve the obvious function of providing a more positive grip of rod 344a when in an eccentric locking orientation. In the arrangement shown in FIG. 20A, rod 344a is locked in its furthest downward position by pivot bar 470 and its associated engagement plates 482. Release of the rod 344a for upward movement is occasioned by the energization of the winding 484 of a solenoid 486 to cause the plunger 488 thereof to move outwardly and thus rotate pivot bar 470 about connection 474 to effect a releasing action. Conversely, when rod 344a and corresponding rod 342a are locked to hold associated float 340a, in its upwardmost orientation, the locking activity is carried out by pivot bar 468 and associated engagement plates 480. To release rod 344a from its uppermost orientation, the winding 490 of solenoid 492 is energized. This causes plunger 494 to move upwardly and thus effect pivotal movement of rod 468 and release of its engagement with rod 344a. Inasmuch as the structures of actuator mechanisms 466 are identical and operated identically within each float assembly 432, the identifying numeration describing such assemblies are retained for each installation thereof in the interest of clarity.

Control over winding 484 and 490 may be carried out by circuitry well known in the art, the control arrangement described in connection with earlier embodiments for wave prediction being available to carry out appropriately timed energizations of the windings. Alternately, systems utilizing sonar or the like may be provided to provide an input signal of wave position for prediction and subsequent control purposes.

Turning now to FIGS. 18, 19 and 20B, conversion assembly 430 as configured for removing useful work during the gravitationally induced downward stroke of a float 340a or a float 340b is revealed. As shown in FIG. 18, within assembly 430 horizontally disposed rods, one of which is revealed at 500a, are positioned between rods 342a and 344b at a location substantially adjacent float 340a. An identical rod (not shown) is positioned in substantially the same general location between rods 342b and 344b coupled to each float 340b. FIG. 20B provides additional detail of the band and drive structure of the arrangement 430, as well as the common wind-up mechanism for those floats. Looking to the latter figure, it may be observed that horizontal support rod 500a carries freely rotatable pulley or idler roll 502a. A corresponding idler roll 502b associated with float 340b is shown in FIG. 18. Passing under the lowermost surface of roll 502a is an elongate flexible band 504a which extends through opening 506 to a connector 506a fixed, in turn, to the bottom surface of platform plate 406. The opposite side of band 504a is connected to and wound about drum assembly 510a, the latter being mounted coaxially over drive shaft 434. As in the embodiment of FIG. 20A, assembly 510a includes a one-way clutch mechanism (not shown) which serves, in the sense of FIG. 20B, to impart a clockwise rotational drive to shaft 434 upon downward movement of rod 344a. Thus, the mechanism 430 serves to remove gravitationally induced work during the downstroke of the float assembly. As in the earlier embodiment, a rewind mechanism also is provided including a cable 512 wound about a cable drum 514, thence about the underside of a freely rotating pulley 514 and to a connector 516 attached to plate 408. A weight 518 is attached to pulley 514 such that with the upward movement of rod 344a, weight 518 will cause cable 512 to unwind from drum assembly 514 which, by virtue of its connection with assembly 510a will provide for the rewinding of band 504a. This same form of connection also will provide for the rewinding of band 504a. This same form of connection also will provide for the rewinding of band 504b associated with adjacent float 340b (FIG. 19).

The actuator mechanism 520 for utilization in connection with assembly 430 may be provided in identical fashion as that provided at 466 for assembly 432. In this regard, FIG. 20B shows the provision of pivot bars 520 and 522 having apertures through which extends rod 344a and which are coupled to plate 408 by respective hinge connectors 524 and 526. Each of the pivot bars 520 and 522 includes a grouping of loosely coupled engagement plates, shown respectively at 528 and 530, and each is biased outwardly from plate 408 by spiral springs, shown respectively at 532 and 534. Pivotal movement of bars 520 and 522 is provided by respective solenoids 536 and 538. In this regard, by energization of winding 540 of solenoid 536, plunger 542 is driven outwardly to cause bar 520 to disengage from rod 344a. Similarly, upon energization of winding 544 of solenoid 538, plunger 546 is driven outwardly to disengage the connection of pivot bar 522 with rod 344a. Control over the energization of windings 540 and 544 is provided as described above.

As indicated hereinabove, the embodiment shown in FIGS. 18 and 19 provides for an alternating form of work removal from floats 340a and 340b along the length of the entire power conversion structure. For example, assemblies 430 operating in conjunction with two floats 340a and 340b are positioned alternately with respect to assemblies 432. With such an arrangement, the stress demands made upon the overall supporting structure are improved through the assertion of alternately directed loadings. However, the invention additionally contemplates the utilization of a float actuation and energy conversion arrangement wherein work is removed from the power floats both during their gravitationally induced descent into the water as well as their flotationally induced movement upwardly from a submerged position.

Turning to FIGS. 21A and 21B, such an arrangement is schematically portrayed at 558. Inasmuch as the figures show an alternate structure which may be incorporated with the earlier described structure, they are patterned after FIGS. 20A and 20B utilizing identical numeration where appropriate without alphabetical suffixes. For example, float 340 is represented having a rod 344 extending upward therefrom and thorugh superstructure 378 including truss members 382 and plate components 406 and 408. Further, it should be observed that the assembly revealed in FIGS. 21A and 21B represents a combination of the assemblies described and depicted in connection with FIGS. 20A and 20B. Looking to the figures, it may be observed that horizontally disposed support rods are provided at 560 and 562 which extend between rod 344 and the corresponding rod 342 spaced therefrom. Over rod 560 is provided a freely rotatable pulley or idler roll 564 while a similar idler roll 566 is journaled for rotation over rod 562. An elongate flexible band 568 extends from its fixed connection with upper plate 406 at connector 570 through opening 571 from thence it extends beneath roll 560, and from there to its winding relationship with winding drum 572a of a drum assembly represented generally at 572. Formed as two drums 572a and 572b each such drum at assembly 572 is mounted over and is coaxial with drive shaft 434 and is coupled thereto through a one-way clutch mechanism (not shown). For the downward movement of float 340, belt 568 is unwound from drum 572a of assembly 572 to impart a clockwise motion to shaft 434 through the noted one-way clutch mechanism.

Work is removed from the upwardly directed flotational drive of float 340 and rods 342 and 344 through the utilization of an elongate band 574 fixed to plate 406 at coupling 576, extending over freely rotatable pulley 566 and connected to drum 572b within assembly 572. Accordingly, as float 340 ascends, belt 574 is unwound from the drum 572b to impart clockwise rotative drive thereto. As in the earlier embodiments, bands 568 and 574 may be provided as high strength steel wires embedded within a protective polymeric matrix such as neoprene or the like. A wind-up drum assembly including drums 575a and 575b additionally is attached to each of the winding drums positioned at 572. In this regard, as the float 340 descends to the lower position shown, a weight 578 coupled through pulley 580 to cable 582 ascends a wind-up drum 575a coupled to the drive drum assembly 572a associated with band 568 is rotated. During the same downward movement, belt 574 is wound upon its associated drive drum 572b at assembly 572 by virtue of the gravitational pull of a weight 586 coupled thorugh pulley 588 to cable 590. One end of cable 590 is fixed to cable wind-up drum 575b which, in turn, is fixed to drive drum 572b associated with band 574. The other side of cable 590 is coupled with connector 584 attached to plate 408. It will be apparent that, as float 340 ascends under flotational drive, weight 578 will drop as cable 582 unwinds and weight 586 will be pulled upwardly to wind cable 90 in anticipation of the next downward gravitationally induced movement of weight 340 and rod 344. Cable 582 is coupled at connector 577 to plate 408. Note, that cables 582 and 590 pass through opening 571 in plate 408 as well as 573 in plate 406.

The actuation and control arrangement for float 340 and the rods 342 and 344 associated therewith is provided utilizing the same type actuator assemblies as are shown at 520 and 466 in connection with respective FIGS. 20A and 20B. In this regard, for the lower assemblies both at rods 342 and 344 pivot bars 592 and 594 are coupled respectively through hinge connectors 596 and 598 to opposite sides of pate 408. Engagement plates are provided at 600 and 602 in connection with respective bars 592 and 594 in the fashion earlier described. Similarly, an actuator arrangement including solenoid and spirally wound springs (not shown) for each of the bars 592 and 594 are represented as positioned within respective housings 604 and 606. As in the earlier embodiments, the control asserted in selectively energizing the windings of the solenoids within housings 604 and 606 are essentially similar to those described herein or may utilize conventional circuitry in connection with sonar wave height determining devices or the like.

In the discourse above, a system is described wherein work is removed from the floats 340 as they move under buoyant force and the extent of that work removal is regulated to permit the momentum of movement of the floats to carry them above the wave crest surface so as to permit a downward preload and work removal. Referring to FIG. 22, a curve 548 is revealed wherein the bottom surface position of a float 340 having a theorectical one foot square cross section is plotted with respect to a mean sea level as the float is released from a depth of 50 feet. For the purpose of the illustration, the float deriving the curve was selected having the weight of one thousand pounds and was subjected to a five hundred pound work load. The distance of work removal was 66.8 feet to derive a work output of 33,400 ft. lbs. Note from the curve, that the bottom of the float exits from the mean water surface following an interval of about 1.6 seconds and continues to an elevation of about 18 feet above mean sea level.

Looking to FIG. 23, the curve 549 shows a corresponding velocity profile for the theoretical float of curve 548.

FIG. 24 shows the corresponding preloading stroke for the float described in connection with FIG. 22 wherein the float is dropped from a level of about 18 feet above the mean sea level into a wave trough. Note that following about 1.4 seconds, the float contacts the mean water line and descends to a level of about 60 feet. Thus, the float is in proper position for a next upward work stroke. The corresponding velocity profile of the float is revealed in FIG. 25 at line 551. The above plots ignore drag and friction considerations, however, as computed above, such factors are of dismissable magnitude.

Figure 26:
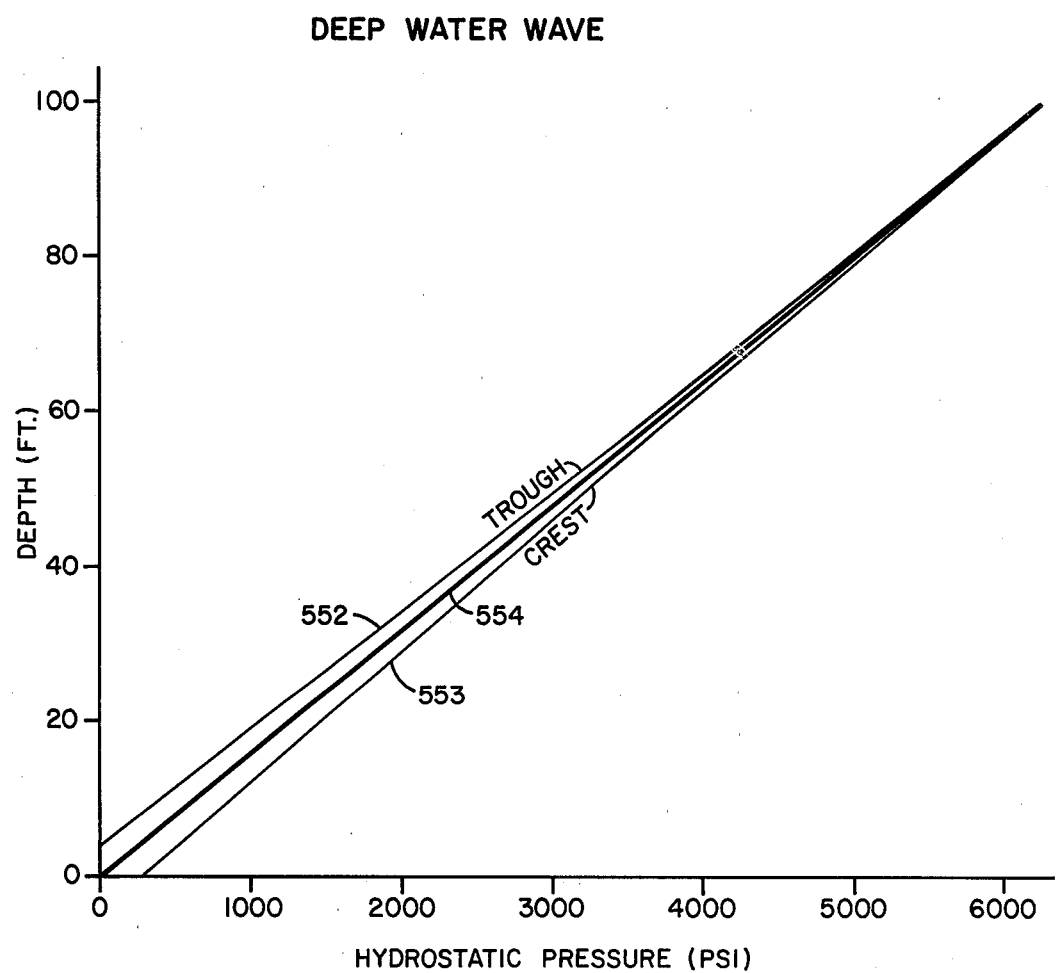
FIG. 26 is a graph plotting hydrostatic pressure against depth for wave crests and troughs.

The theoretical capability of the float 340 to achieve the return to a proper depth on the downstroke stems from a recognition of the physical attributes of a wave crest and trough. Looking to FIG. 26, curves relating depth and hydrostatic pressure for a deep water wave having a height of 10 feet, a length of 500 feet and a period of ten seconds are plotted. In this regard, curve 552 plots hydrostatic pressure with depth for the trough of the ten foot wave, while curve 553 plots the corresponding hydrostatic pressure-depth relationship for the crest of the same wave. The line 554 shows the mean value between the two. Observing any two horizontally spaced points on the curves for a given depth will reveal a considerable pressure gain through the unique use of the trough and crest relationships of the system of the invention. For example, a comparison of corresponding horizontal points between curves 552 and 553 shows that the hydrostatic pressure for a given depth beneath a trough is considerably lower than the corresponding pressure beneath a crest at curve 553. This differential is taken advantage of with the instant invention to permit the achievement of a full downward preload stroke wherein float 340 reaches a predetermined advantageous depth even though work is removed in the course of all float movements.

Figure 27:
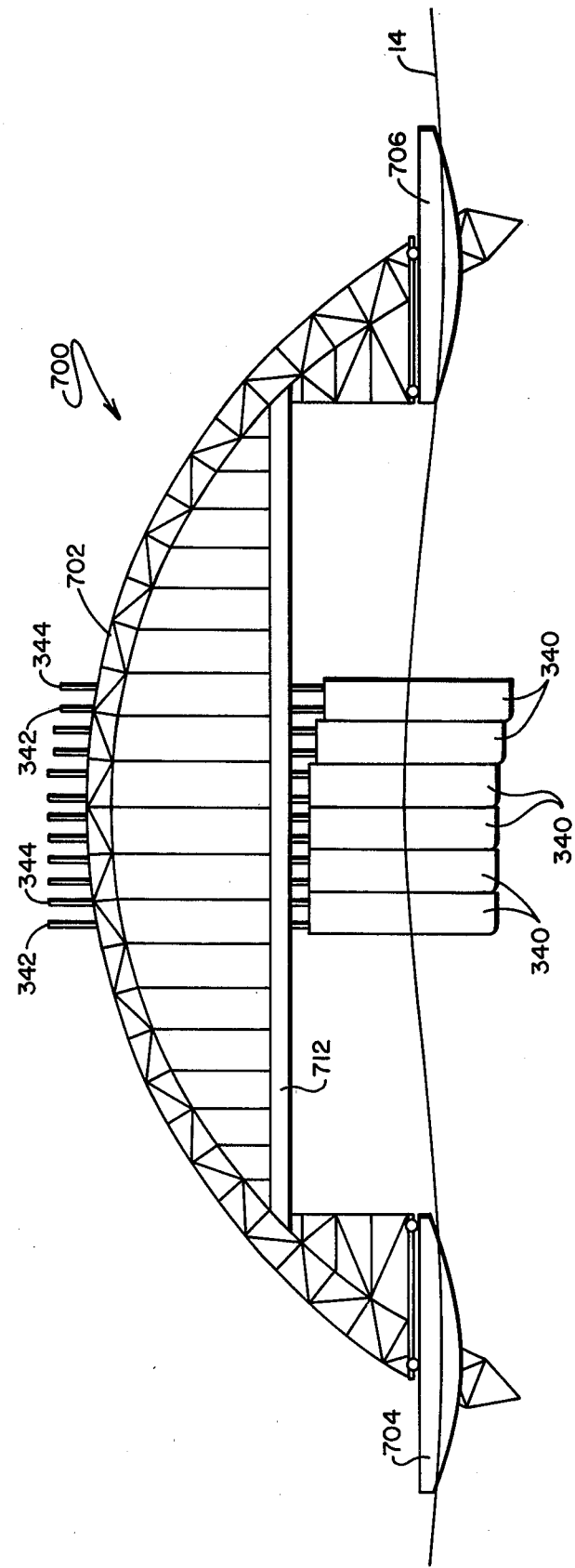
FIG. 27 is a schematic and exaggerated view of the end of a structure incorporating still another embodiment of the invention.
Figure 28:
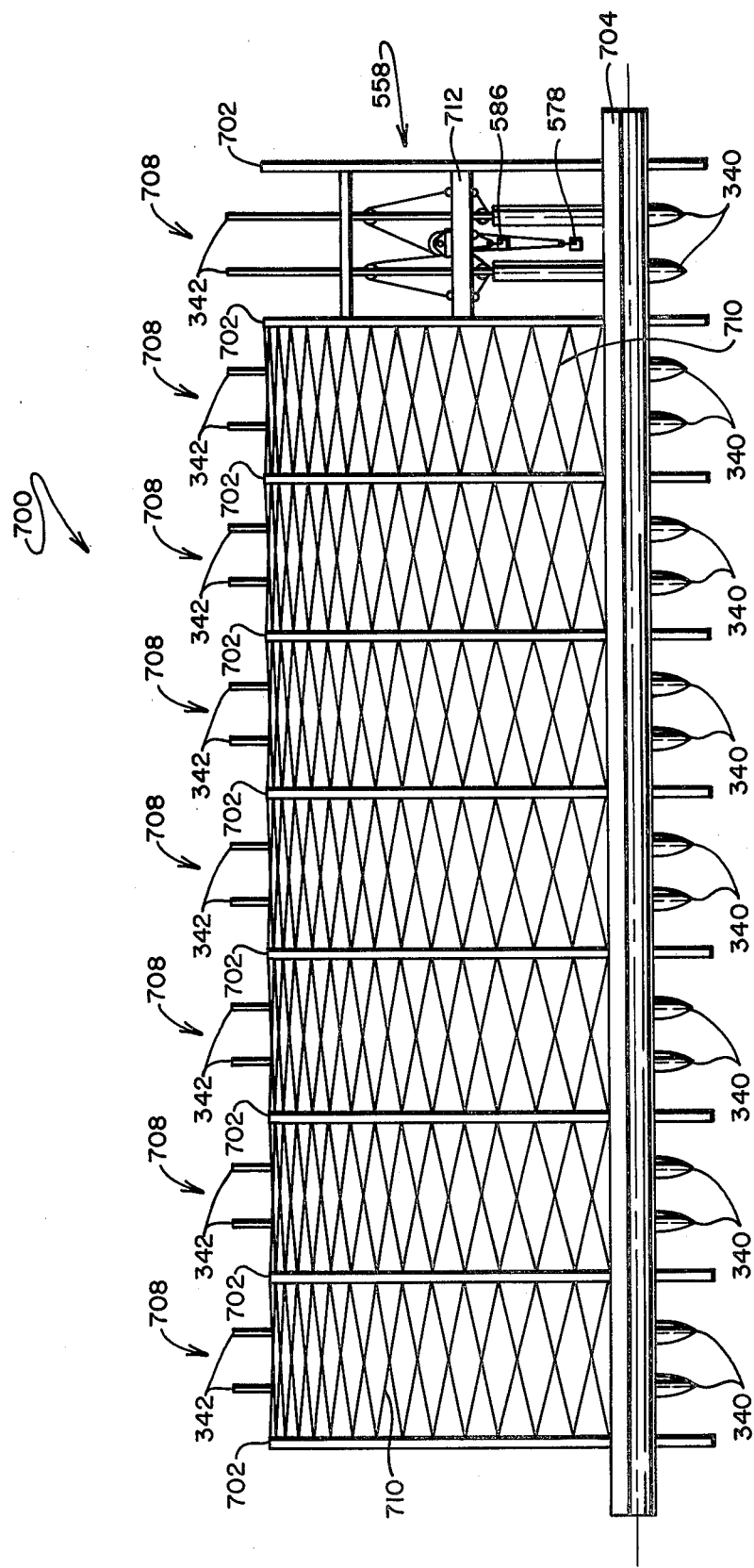
FIG. 28 is a side view of the structure of FIG. 27.

Looking now to FIGS. 27 through 30 still another embodiment of the invention is illustrated. Referring initially to FIGS. 27 and 28, the general features of a structure incorporating the instant embodiment are illustrated. Note, that the instant embodiment involves an arrangement formed generally as an arch-like structure identified at 700. As represented in FIG. 28, each of the arch-like components 702 of the structure 700 extend between large floats 704 and 706 to define a series of parallel and adjacent bays each of which is represented at 708. These bays are mutually, laterally supported by a diagonal framework of structural members, certain of which are shown at 710 in FIG. 28 with the exception of one extreme end bay, the members 710 being removed therefrom to reveal internal structure. FIGS. 27 and 28 further reveal internal structure. FIGS. 27 and 28 further reveal the presence of a deck or platform 712 extending horizontally across the arch component 702 and intended to support a plurality of floats again given the common designation 340. Floats 340 may be arranged in tandem rows of two in each bay and supported generally from platform 712. Further, the floats 340 may be actuated by and operated in conjunction with the work removal systems described at 558 in FIG. 21 wherein work is converted both during the gravitationally induced downward movement thereof as well as with the flotationally induced upward movement. The rods fixed to and extending from floats 340 again are designated at 342 and 344, inasmuch as these rods serve the same functions as described in connection with FIGS. 15A et seq. The scale of the figures illustrating the instant embodiment necessarily is distorted in the drawings relating thereto. This is occasioned inasmuch as the distance between floats 704 and 706 of the structure 700, in actual scale, conforms somewhat to a median wave length, i.e. about 500 feet. Resort to an arch-like structure to achieve the span required thus becomes apparent, however, by selecting a structure of such magnitude, a unique advantage obtains by virtue of the preloading aspects of the overall system.

Figure 29A:
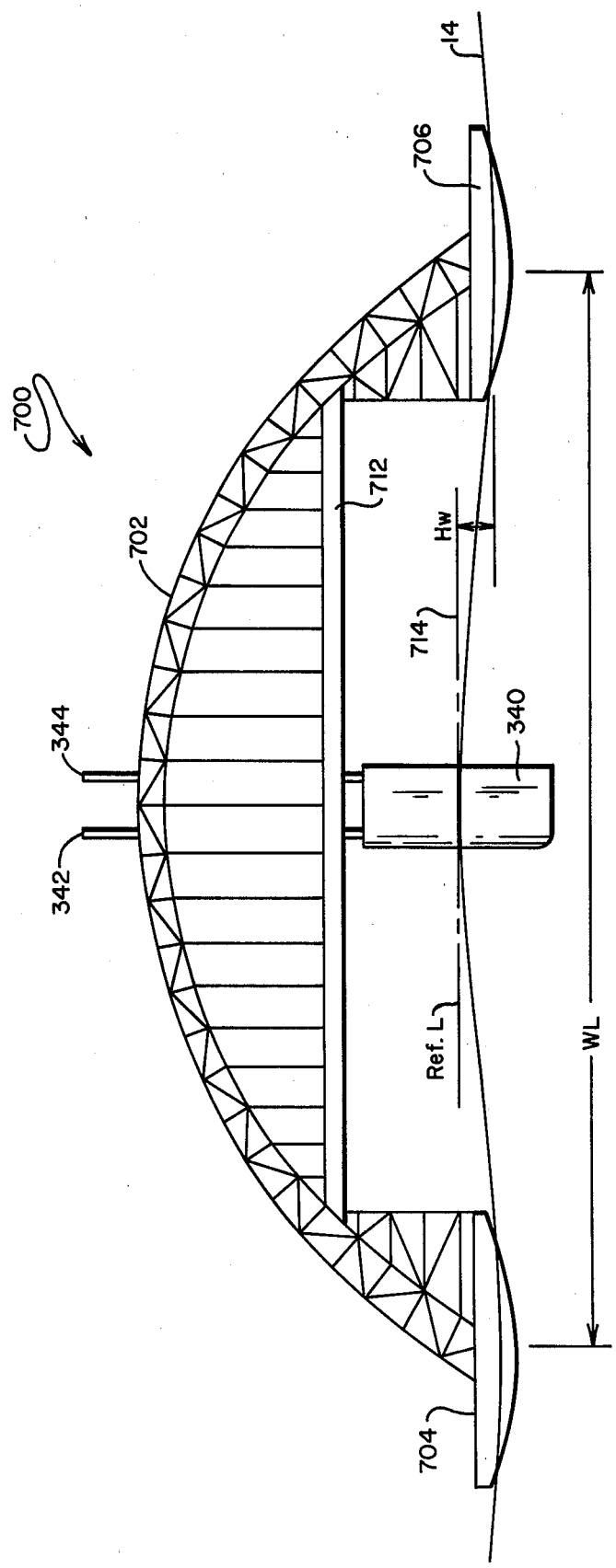
FIGS. 29A-29D show a series of schematic representations of the structure of FIGS. 26 and 27 with respect to a sea wave form.

Looking to FIGS. 29A-29D, the operational aspects achieving this advantageous preloading are schematically illustrated. FIG. 29A is presented to show relative reference levels and the like in a manner similar to the presentation provided at FIG. 15A. In this regard, note that the float 340 is shown extending from rods 342 and 344 from platform 712. The arch-like component 702 is shown extending between floats 704 and 706 which are mutually spaced a distance equivalent to one wavelength, $W_1$, of the waveform, again represented schematically at line 14. Float 340 is shown in an equilibrium orientation floating at the crest of a waveform 14, that waveform having a wave height, $H_w$, as shown, extending downwardly from a reference line identified at 714. Reference line 714 provides a constant elevation reference which does not vary throughout the drawings 29A-29D. Thus, the relative movement of the entire structure 700 with respect to waveform 14 as well as the relative movement of float 340 with respect thereto can be observed more clearly.

Figure 29B:
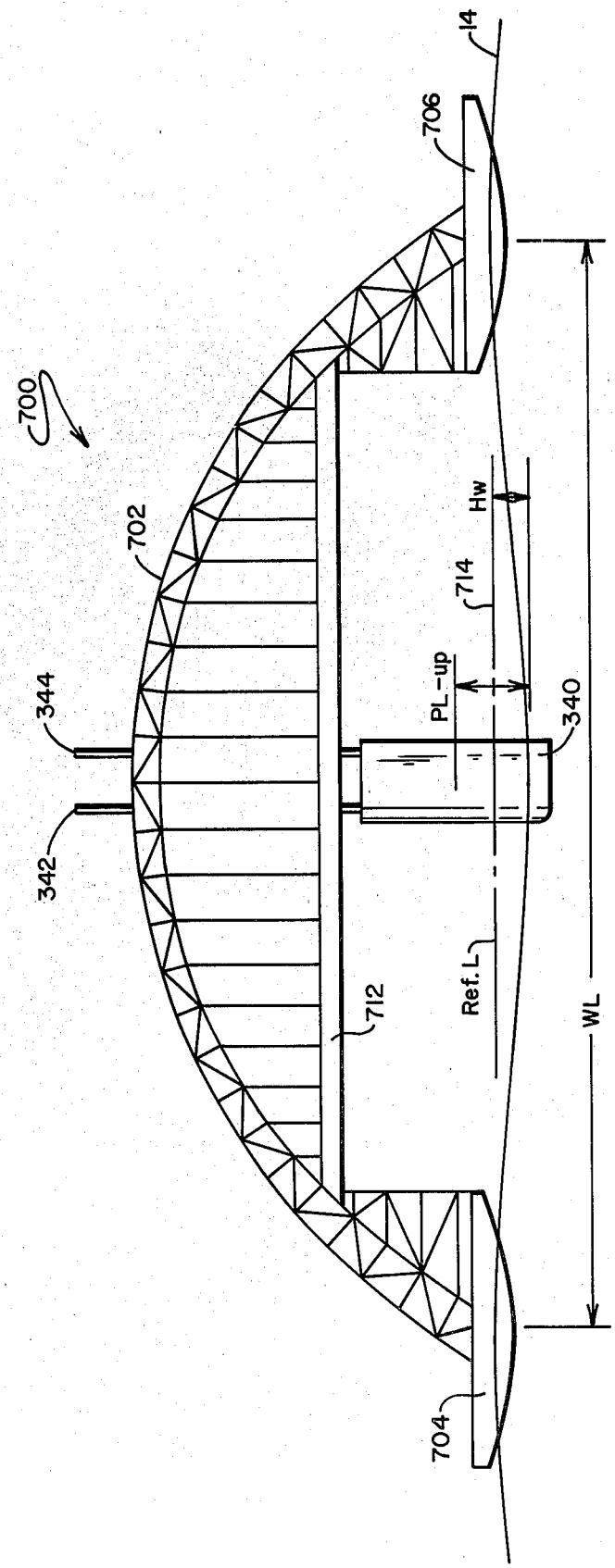

Looking to FIG. 29B, the float 340 retains the same orientation with respect to structure 700 as shown in FIG. 29A. However, wave crests within waveform 14 now have simultaneously developed beneath floats 704 and 706 to elevate the entire structure 700 by an amount substantially equivalent to one wave height, Hw. Because the spacing between the floats 704 and 706 is substantially equivalent to a wave length, WL, a corresponding trough evolves a float 340. With the arrangement, float 340 now is locked in position upon structure 700 at a relative elevation with respect to the wave trough amounting to twice the wave height, Hw, and is appropriately oriented for release into the trough.

Figure 29C:
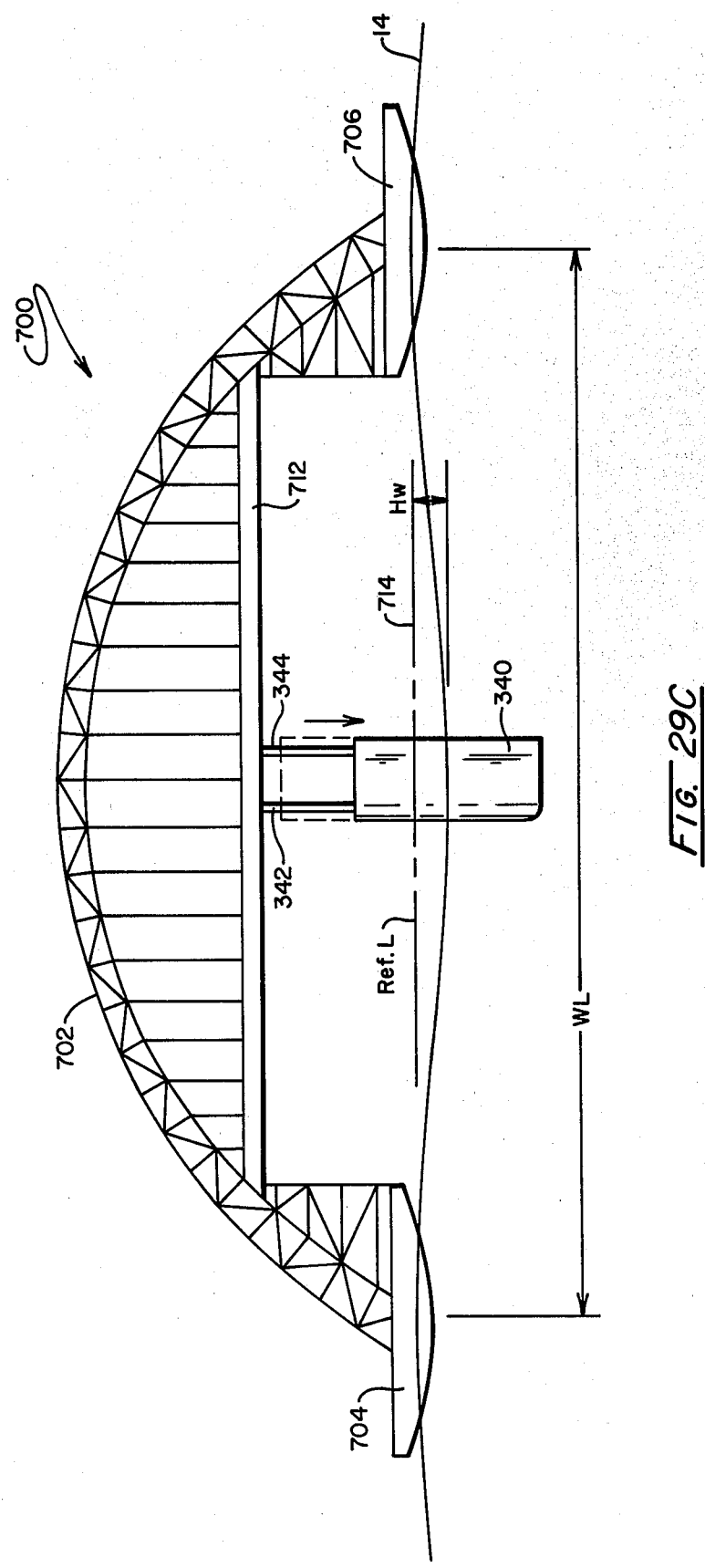

Looking to FIG. 29C, float 340 is shown as it drops into the wave trough from the elevation shown in FIG. 29B, this distance amounting to two wave heights. Assuming a preferred arrangement wherein all work equivalent to the preloading advantage is removed, the float 340 will descend only to its equilibrium position as shown in the figure. Float 340 then is locked at this orientation by the actuation and control mechanism such as that described earlier hereinabove.

Figure 29D:
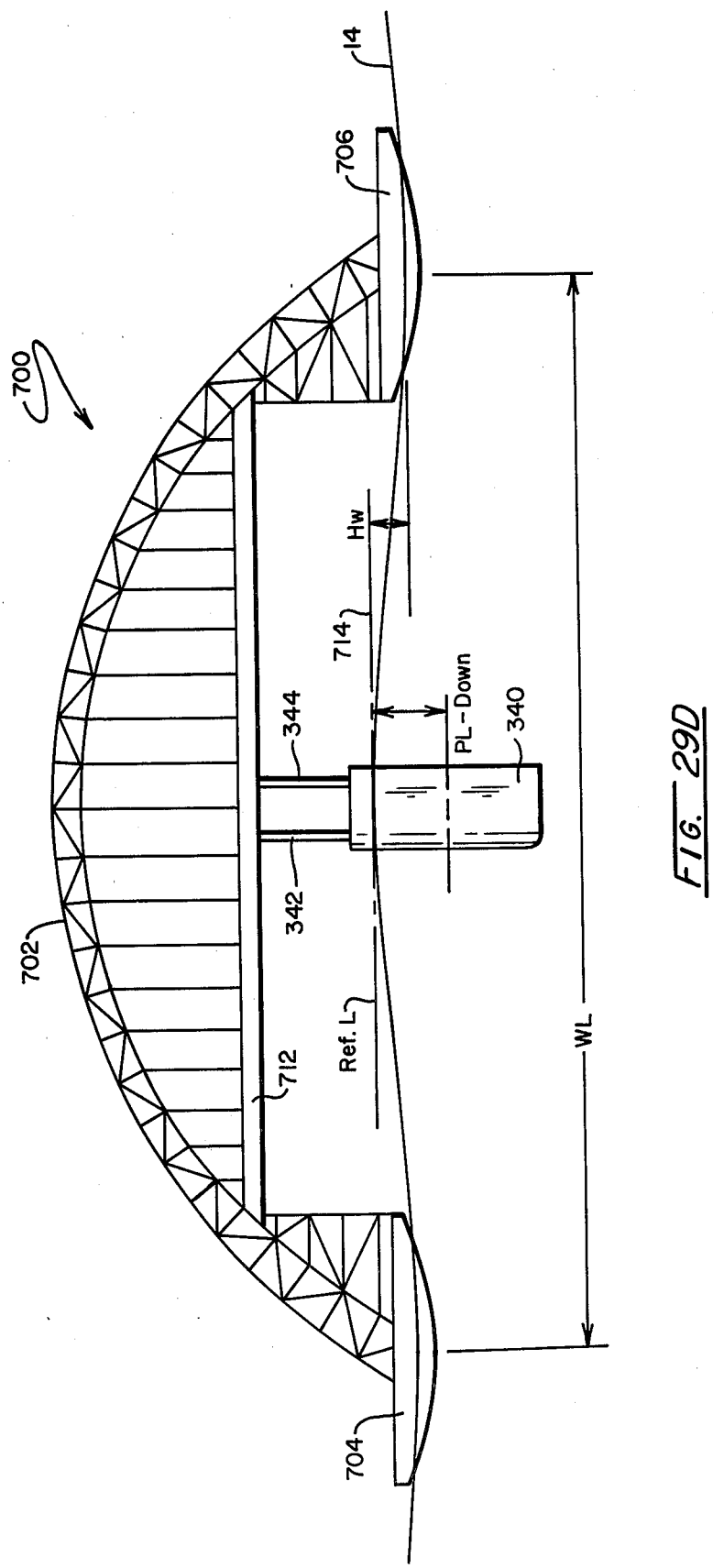

Turning finally to FIG. 29D, floats 704 and 706 now encounter a wave trough within waveform 14 and the entire structure 700 descends the equivalent of one wave height, Hw. Additionally however, a crest develops at float 340 and the equivalent preloading then becomes two wave heights. Upon release from this position, the float 340 is permitted to return to the orientation shown in FIG. 29A, it being preferred that all preloading equivalent work be removed from the float such that it returns to its equilibrium orientation.

In the discourse above, the structure 700 has been described as having a length between floats 704 and 706 equivalent to one wave length and, typically, this length will be about 500 feet. To provide a tuning form of adjustment to accommodate structure 700 to the wave lengths encountered, the floats 704 and 706 may be mounted with respect to arch-like component 702 such that they may be moved horizontally, for example, over a distance of about 75 feet. FIG. 30 schematically represents such an arrangement wherein the component 702 is mounted upon and supported upon a base structural member 720. Member 720, in turn, supports a series of rollers or wheels 722a–722d are mounted upon extensions fixed to structural member 720 in an orientation where they ride beneath the underside of rail 724, thus securing float 704 from vertical movement. Horizontal movement of the rail 724 is carried out by actuating a two-way hydraulic cylinder drive shown including cylinder 728 and rod 730. Rod 730 is pivotally coupled to frame component 702 at 732, while the base of the cylinder 728 is fixed to an upstanding abutment 734 fixed to float 704. By actuating the hydraulic cylinder in accordance with the desires of the operator, the float 704 may be manipulated, for example, to the orientation shown in phantom at 704' in the drawing.

Since certain chainges may be made in the abovedescribed apparatus, method and system without departing from the scope of the invention herein involved, it is intended that all matter contained in the above description or shown in the accompanying drawings shall be interpreted as illustrative and not in a limiting sense.

What is claimed is:

1. A method for converting the energy of waves generated within a large body of water into useful power comprising the steps of:
   providing a buoyant body floatable within said water;
   submerging said buoyant body to a predetermined level beneath the immediate surface of said water when situated at the trough of a given said wave;
   retaining said buoyant body at said level of submergence;
   releasing said retained buoyant body for vertical flotational movement through the crest defined portion of a said wave; and
   converting said vertical flotational movement into useful power.

2. The method of claim 1 wherein said step releasing said buoyant body for vertical flotational movement is carried out when said buoyant body is situated substantially beneath the crest of a wave.

3. The method of claim 1 wherein said step of submerging is carried out by retaining at least a portion of said buoyant body a predetermined distance above the surface of said wave trough and subsequently releasing it to permit its gravitational, accelerative descent to said predetermined level beneath the surface of said wave trough.

4. The method of claim 1 wherein said buoyant body is configured incorporating an elongate tubular wave pump and said converting step includes the steps of:
   accumulating water under pressure from said wave pump; and
   driving a turbine actuated generator of electrical power from said accumulated water under pressure.

5. The method of claim 1 wherein:
   said step of converting said vertical flotational movement is carried out by converting the force of said vertical flotational movement of said buoyant body to rotational movement; and
   converting said rotational movement to electrical power.

6. The method of claim 3 in which said step of converting said rotational movement to electrical power further comprises the steps of:
   pressurizing a hydraulic fluid;
   conveying said fluid under pressure to a fluid motor;
   driving said motor from said fluid under pressure to derive a rotative output;
   converting said rotative output to electrical energy; and
   returning fluid from said motor for repressurization.

7. A method for converting the energy of waves generated within a large body of water into useful power comprising the steps of:
   providing an elongate buoyant body of predetermined weight floatable within said water, said body having an equilibrium level when floating in said water in a quiescent state;
   retaining said buoyant body at a predetermined level above said equilibrium level;
   releasing said buoyant body for gravitationally induced vertical accelerative movement to a predetermined submerged level beneath said equilibrium level when situated at the trough of a given said wave;
   converting at least a portion of said gravitationally induced movement into useful power;
   retaining said buoyant body at said level of submergence; and
   releasing said submerged retained buoyant body for vertical flotational movement through the crest defined portion of a said wave.

8. The method of claim 7 wherein said step releasing said buoyant body for vertical flotational movement is carried out when said buoyant body is situated substantially beneath the crest of a wave.

9. The method of claim 7 wherein:
   said step of converting said gravitationally induced movement into useful power is carried out by converting the force of said accelerative movement of said buoyant body to rotational movement, and converting said rotational movement into electrical power.

10. The method of claim 7 including the steps of converting said vertical flotational movement into useful power.

11. The method of claim 10 wherein:
said step of converting said vertical flotational movement is carried out by converting the force of said vertical flotational movement of said buoyant body to rotational movement; and
converting said rotational movement to electrical power.

12. A system for converting to a useful power form, the energy of waves present within a body of water, said waves exhibiting a given value of waveform height between crests and troughs, comprising:
means for defining a support substantially stable with respect to the instantaneous mean height of said waves;
a buoyant body communicating with and supported for movement from said support, said movement being generally vertical with respect to said body of water;
actuator means, initially actuable to effect a submergence of said buoyant body to a predetermined level beneath the surface of said body of water and subsequently actuable to release said buoyant body for flotational vertical movement;
converter means in energy transfer communication with said buoyant body for converting the said flotational vertical movement to a communicable energy form; and
control means for initially actuating said actuator means to effect said submergence substantially when said buoyant body is situated substantially over a said trough and for effecting said subsequent releasing actuation substantially when said buoyant body is situated beneath a said crest.

13. The system of claim 12 in which said actuator means is configured for engaging said buoyant body when floating at the surface of a wave crest and releasing said buoyant body for gravitational movement to effect said submergence.

14. The system of claim 12 in which said actuator means is configured for engaging and retaining said buoyant body at said predetermined level of submergence.

15. The system of claim 12 in which said means defining a support comprises at least one elongate buoyant hull of mass and size selected for said stability with respect to said instantaneous mean wave height.

16. The system of claim 15 in which said hull is configured having a height equivalent to at least about one mean wave height within a water body region selected for operation, and a length of at least about three corresponding lengths of said wave.

17. The system of claim 15 in which said actuator means comprises:
an elongate rack fixed to said buoyant body, vertically oriented thereupon and moveable therewith;
pinion means engaged with and rotatable in conjunction with movement of said rack; and
said control means includes brake means for carrying out said actuation by selective braking of said pinion means.

18. The system of claim 17 in which said brake means comprises:
a toothed wheel coupled in driven relationship with said pinion means, at least one interceptor pawl engageable with said wheel to permit only unidirectional rotation thereof;
spring means biasing said interceptor pawl into engagement with said wheel; and
solenoid means energizable from said control means for selectively moving said interceptor pawl out of engagement with said wheel.

19. The system of claim 17 in which said means defining a support comprises:
two said buoyant hulls; and
superstructure means mounted upon said hulls and structurally supporting them in spaced, parallel relationship.

20. The system of claim 12 in which said converter means comprises:
an elongate tube positionable in a substantially vertical orientation within said body of water and having an upper portion fixed to said buoyant body;
valve means positioned within said tube upper portion and configured to permit only the upwardly directed flow of water therethrough; and
accumulator means mounted upon said platform and in fluid communication with said valve means for accumulating water under pressure developed within said tube.

21. The system of claim 20 in which said converter means further comprises water driven turbine means having an input coupled in fluid communication with said accumulator means for deriving a rotational power output; and
generator means having an input connected in driven relationship with said turbine means power output for generating electrical power.

22. The system of claim 12 in which said means defining a substantially stable support comprises:
an elongate rigid column positioned generally vertically within said body of water and having s submerged end and a top end extending above said wave crests;
anchoring means pivotally coupled with said submerged end of said column for retaining said column at a predetermined location within said body of water; and
a submerged stabilizing float fixed to said column beneath the surface of said body of water at a predetermined elevation above said anchoring means and exhibiting a predetermined buoyancy for retaining said column in said vertical position.

23. The system of claim 22 in which said buoyant body is configured as an elongate float slideably mounted for vertical movement upon said column and having a length of extent sufficient to maintain the upwardly disposed portion thereof at an elevation above said wave crests.

24. The system of claim 23 in which said actuator means comprises:
means defining a rack fixed to said rigid column in the vicinity of said top end;
means defining a pinion mounted upon said buoyant body upwardly disposed portion, engageable in rotational driven communication with said rack; and
brake means coupled with said pinion for selectively braking the rotation thereof.

25. The system of claim 24 in which said converter means comprises:
unidirectional drive means mounted upon said buoyant body upwardly disposed portion in drive communication with said pinion and deriving a rotational power output therefrom when said buoyant body is released for said flotational vertical movement; and means for generating electrical power from said rotational output.

26. The system of claim 25 in which said means for generating electrical power from said rotational output comprises:

flywheel means coupled in driven relationship with said unidirectional drive means drive output;

means defining a fluid retaining conduit circuit;

hydraulic pump means coupled in driven relationship with said flywheel means and having an input and output coupled within said conduit for pressurizing the fluid therewithin;

motor means coupled in driven relationship within said conduit circuit and responsive to said pressurized fluid therewithin for providing a drive output; and generator means coupled in driven relationship with said motor means drive output for generating electrical power.

27. The system of claim 26 in which said means defining a fluid retaining conduit circuit extends from said means defining a support to a land region adjacent the terrestrial shore of said body of water, and said motor means and generator means are situated at said land region.

28. The system of claim 27 wherein said means defining a fluid retaining conduit includes flotation means for supporting said conduit substantially at the surface of said body of water.

29. The system of claim 12 in which said converter means comprises:

rotatable means mounted upon said support rotatably drivable for converting rotational drive imparted thereto into communicable energy;

unidirectional drive means mounted upon said support including a winding surface coupled with said rotatable means and rotatably actuable in a first rotational sense to impart said drive thereto and actuable to rotate in a second rotational sense;

freely rotatable pulley means mounted above and vertically drivably moveable by said buoyant body;

a flexible elongate band, substantially non-deformable in tension, having one terminus fixed at a predetermined coupling to said support and extending upwardly therefrom over and in contact with said freely rotatable pulley means to another terminus fixed to said winding surface, said band being windable upon said winding surface and being unwindable therefrom for actuating said unidirectional drive means in said first rotational sense; and rewind means for actuating said unidirectional drive means to rotate in said second rotational sense subsequent to said first rotational sense actuation for effecting the rewinding of said band when said actuator means is actuated to effect said buoyant body submergence.

30. The system of claim 29 in which said freely rotatable pulley means is mounted upon an elongate structure fixed to and extending above said buoyant body.

31. The system of claim 29 in which said rotatable means comprises a drive shaft coupled in driven relationship with said unidirectional drive means, rotatable flywheel means and means for converting the rotation of said flywheel means into communicable energy.

32. The system of claim 12 in which said means defining a support is present as an off-shore platform supported from the bottom terrain of said body of water.

33. A system for converting to a useful power form the energy of waves present within a body of water, said waves exhibiting a given value of wavelength and waveform height between crests and troughs, comprising:

support means including a structure extending between floats mutually spaced a distance corresponding with said wavelength value to effect elevation and descent movement of said structure between first and second heights above said body of water in correspondence with the positioning of said spaced floats substantially at respective spaced adjacent crests and spaced adjacent troughs of a said waveform;

a buoyant body communicating with and supported for movement from said structure, said movement being generally vertical with respect to said body of water;

actuator means mounted upon said structure, initially actuable to release said buoyant body for gravitationally induced movement to a predetermined level beneath the surface of said body of water and subsequently actuable to release said buoyant body for flotational vertical movement;

converter means in energy transfer communication with said buoyant body for converting the said flotational vertical movement to a communicable energy form; and control means for initially actuating said actuator means when said spaced floats are positioned substantially over said crests and for effecting said subsequent releasing actuation substantially when said floats are positioned within said troughs.

34. The system of claim 33 wherein said converter means further converts the said gravitationally induced movement of said buoyant body to a communicable energy form.

35. The system of claim 33 further comprising means for selectively adjusting the said spacing of said support means floats.

36. The system of claim 33 in which said converter means comprises:

rotatable means mounted upon said support rotatably driveable for converting rotational drive imparted thereto into communicable energy;

unidirectional drive means mounted upon said support means including a winding surface coupled with said rotatable means and rotatably actuable in a first rotational sense to impart said drive thereto and actuable to rotate in a second rotational sense;

freely rotatable pulley means mounted above and vertically driveably moveable by said buoyant body;

a flexible elongate band, substantially non-deformable in tension, having one terminus fixed at a predetermined coupling to said support means and extending upwardly therefrom over and in contact with said freely rotatable pulley means to another terminus fixed to said winding surface, said band being windable upon said winding surface and being unwindable therefrom for actuating said unidirectional drive means in said first rotational sense; and rewind means for actuating said unidirectional drive means to rotate in said second rotational sense subsequent to said first rotational sense actuation for effecting the rewinding of said band when said actuator means is actuated to effect said buoyant body submergence.

37. The system of claim 34 in which said converter means comprises:

rotatable means mounted upon said support means rotatably driveable for converting rotational drive imparted thereto into communicable energy;

first unidirectional drive means mounted upon said support means at a given elevation above said body of water, including a first winding surface coupled with said rotatable means and rotatably actuable in a first rotational sense to impart drive thereto and actuable to rotate in a second rotational sense;

first freely rotatable pulley means mounted above said buoyant body below said given elevation and vertically driveably moveable by said buoyant body;

a first flexible elongate band, substantially nondeformable in tension, having one terminus fixed at a predetermined coupling to said support means and extending downwardly therefrom under and in contact with said first freely rotatable pulley means to another terminus fixed to said winding surface, said first band being windable upon said first winding surface and subsequently unwindable therefrom for actuating said first unidirectional drive means in said first rotational sense;

second unidirectional drive means mounted upon said support means, including a second winding surface coupled with said rotatable means and rotatably actuable in said first rotational sense to impart drive thereto and actuable to rotate in said second rotational sense;

second freely rotatable pulley means mounted above and vertically driveably moveable by said buoyant body;

a second flexible elongate band, substantially nondeformable in tension, having one terminus fixed at a predetermined coupling to said support means and extending upwardly therefrom over and in contact with said second freely rotatable pulley means to another terminus fixed to said second winding surface, said second band being windable upon said second winding surface and subsequently unwindable therefrom for actuating said second unidirectional drive means in said first rotational sense; and rewind means for actuating said first and second unidirectional drive means to rotate in said second rotational sense subsequent to said first rotational sense actuation for effecting a rewinding of said first band when said actuator means is actuated to effect said buoyant body release flotational vertical movement and for effecting a rewinding of said second band when said actuator means is actuated to effect said buoyant body release for gravitationally induced movement.

38. A system for converting to a useful power form the energy of waves present within a body of water, said waves exhibiting a given value of waveform height between crest and troughs, comprising:

means defining a support positionable above said waves;

a buoyant body having a predetermined weight communicating with and supported for movement from said support, said movement being generally vertical with respect to said body of water and said buoyant body having a predetermined equilibrium level when floating in a quiescent state;

actuator means mounted upon said support, initially actuable to release said buoyant body from a predetermined elevation thereof for gravitationally induced movement to a predetermined submerged level wherein said equilibrium level is below the surface of said body of water, and subsequently actuable to release said buoyant body for flotational vertical movement;

converter means in energy transfer communication with said buoyant body for converting a predetermined portion of the work represented by said gravitationally induced movement into a communicable energy form; and control means for actuating said actuator means to effect said release of said buoyant body for said gravitationally induced movement to said predetermined submerged level when said buoyant body is situated substantially over a said trough, for effecting the retention of said released buoyant body by said actuator means at said submerged level for effecting the subsequent releasing actuation thereof when said buoyant body is situated beneath a said crest, and for effecting a subsequent retention of said buoyant body by said actuator means when said buoyant body returns by said flotational movement substantially to said predetermined elevation.

39. The system of claim 38 in which said converter means comprises:

rotatable means mounted upon said support rotatably driveable for converting rotational drive imparted thereto into communicable energy;

unidirectional drive means mounted upon said support at a given elevation above said body of water, including a winding surface coupled with said rotatable means and rotatably actuable in a first rotational sense to impart said drive thereto and actuable to rotate in a second rotational sense;

freely rotatable pulley means mounted above said buoyant body below said given elevation and vertically driveably moveable by said buoyant body;

a flexible elongate band, substantially nondeformable in tension, having one terminus fixed at a predetermined coupling to said support and extending downwardly therefrom under and in contact with said freely rotatable pulley means to a second terminus fixed to said winding surface, said band being windable upon said winding surface and subsequently unwindable therefrom for actuating said unidirectional drive means in said first rotational sense; and rewind means for actuating said unidirectional drive means to rotate in said second rotational sense subsequent to said first rotational sense actuation for effecting a rewinding of said band when said actuator means is actuated to effect said release of said buoyant body for flotational vertical movement.

40. The method of claim 39 wherein said step releasing said buoyant body for vertical flotational movement is carried out when said buoyant body is situated substantially beneath the crest of a wave.

41. The method of claim 39 wherein said step of submerging is carried out by retaining at least a portion of said buoyant body a predetermined distance above the surface of said wave trough and subsequently releasing it to permit its gravitational, accelerative descent to said predetermined level beneath the surface of said wave trough.

42. A method for converting the energy of waves of given wavelength generated within a large body of water into useful power comprising the steps of:
providing a floatable support including a structure extending over said waves and supported thereon between buoyant float components mutually spaced a distance substantially corresponding with a said given wavelength;
providing an elongate buoyant body floatable within said water and releasably supportable from said structure;
releasing said buoyant body from said structure when said float components are floatably supported upon a said crest to move said buoyant body under gravitationally induced movement submerging said buoyant body beneath the surface of said water and to a predetermined level with respect to said structure when said buoyant body is substantially situated at a trough of said wave;
retaining said buoyant body at said predetermined level with respect to said structure;
releasing said retained buoyant body for vertical flotational movement through the crest of said wave when said float components are floatably supported upon a said trough; and
converting said vertical flotational movement into useful power.

43. The method of claim 42 including the step of converting said gravitationally induced movement into useful power.

44. The method of claim 43 wherein:
said step of converting said vertical flotational movement is carried out by converting the force of said vertical flotational movement of said buoyant body to rotational movement; and
converting said rotational movement to electrical power.

45. The method of claim 43 wherein:
said step of converting said gravitationally induced movement is carried out by converting force of said gravitionally induced movement of said buoyant body to rotational movement; and
converting said rotational movement to electrical power.

46. A system for converting to a useful power form, the energy of waves present within a body of water, said waves exhibiting a given value of wave form height between crests and troughs, comprising:
means defining a support positionable above said waves;
a buoyant body having a predetermined weight communicating with and supported for movement from said support, said movement being generally vertical with respect to said body of water;
actuator means mounted upon said support, mutually actuable to release said buoyant body from a predetermined elevation thereof for gravitationally induced movement to a predetermined level beneath the surface of said body of water and subsequently actuable to release said buoyant body for flotational vertical movement;
converter means in energy transfer communication with said buoyant body for converting a predetermined portion of the work represented by said flotational vertical movement and a predetermined portion of the work represented by said gravitationally induced movement into a communicable energy form; and
control means for actuating said actuator means to effect said release of said buoyant body for said gravitationally induced movement to said predetermined level when said buoyant body is situated substantially over a said trough, for effecting the retention of said released buoyant body at said actuator means at said predetermined level, for effecting the subsequent releasing by actuation thereof when said buoyant body is situated beneath said crest, and for effecting a subsequent retention of said buoyant body by said actuator means when said buoyant body returns by said flotational movement substantially to said predetermined elevation.

47. The system of claim 46 in which said converter means comprises:
rotatable means mounted upon said support, rotatably drivable for converting rotational drive imparted thereto into communicable energy;
first unidirectional drive means mounted upon said support at a given elevation above said body of water, including a first winding surface coupled with said rotatable means and rotatably actuable in a first rotational sense to impart drive thereto and actuable to rotate in a second rotational sense;
first freely rotatable pulley means mounted above said buoyant body below said given elevation and vertically drivably moveable by said buoyant body;
a first flexible elongate band, substantially non-deformable in tension, having one terminus fixed at a predetermined coupling to said support and extending downwardly therefrom under and in contact with said first freely rotatable pulley means to another terminus fixed to said winding surface, said first band being windable upon said first winding surface and subsequently unwindable therefrom for actuating said first unidirectional drive means in said first rotational sense;
second unidirectional drive means mounted upon said support, including a second winding surface coupled with said rotatable means and rotatably actuable in said first rotational sense to impart drive thereto and actuable to rotate in said second rotational sense;
second freely rotatable pulley means mounted above and vertically driveably moveable by said buoyant body;
a second flexible elongate band, substantially non-deformable in tension, having one terminus fixed at a predetermined coupling to said support and extending upwardly therefrom over and in contact with said second freely rotatable pulley means to another terminus fixed to said second winding surface, said second band being windable upon said second winding surface and subsequently unwindable therefrom for actuating said second unidirectional drive means in said first rotational senses; and
rewind means for actuating said first and second unidirectional drive means to rotate in said second rotational sense subsequent to said first rotational sense actuation for effecting a rewinding of said first band when said actuator means is actuated to effect said buoyant body release for flotational vertical movement and for effecting a rewinding of said second band when said actuator means is actuated to effect said buoyant body release for gravitationally induced movement.

48. The system of claim 47 in which said first and second freely rotatable pulley means are mounted upon an elongate structure fixed to and extending above said buoyant body.

49. The system of claim 47 in which said rotatable means comprises a drive shaft coupled in driven relationship with said first and second unidirectional drive means, rotatable flywheel means and means for converting the rotation of said flywheel means into communicable energy.

* * * * *